(12) United States Patent
Fowler et al.

(10) Patent No.: US 8,090,817 B2
(45) Date of Patent: *Jan. 3, 2012

(54) METHOD AND SYSTEM FOR MONITORING COMPUTER NETWORKS AND EQUIPMENT

(75) Inventors: John J. Fowler, Austin, TX (US); Gerard L. Cullen, Austin, TX (US)

(73) Assignee: American Power Conversion Corporation, West Kingston, RI (US)

( * ) Notice: Subject to any disclaimer, the term of this patent is extended or adjusted under 35 U.S.C. 154(b) by 1701 days.

This patent is subject to a terminal disclaimer.

(21) Appl. No.: 10/775,899

(22) Filed: Feb. 10, 2004

(65) Prior Publication Data
US 2004/0163102 A1 Aug. 19, 2004

Related U.S. Application Data

(63) Continuation of application No. 09/429,504, filed on Oct. 27, 1999, now Pat. No. 6,714,977.

(51) Int. Cl.
*G06F 15/173* (2006.01)

(52) U.S. Cl. .......... 709/224; 709/217; 709/219; 700/80; 700/83

(58) Field of Classification Search .................. 709/217, 709/224, 219; 700/1, 80, 83
See application file for complete search history.

(56) References Cited

U.S. PATENT DOCUMENTS

| | | | |
|---|---|---|---|
| 3,810,138 A | 5/1974 | Thompson et al. | |
| 4,349,879 A | 9/1982 | Peddie et al. | |
| 4,521,645 A | 6/1985 | Carroll | |
| 4,568,934 A | 2/1986 | Allgood | |
| 4,636,652 A | 1/1987 | Raes | |
| 4,637,020 A | 1/1987 | Schinabeck | |
| 4,650,347 A | 3/1987 | Shigemura et al. | |
| 4,668,939 A | 5/1987 | Kimura et al. | |
| 4,686,450 A | 8/1987 | Pichat | |
| 4,718,025 A | 1/1988 | Minor et al. | |

(Continued)

FOREIGN PATENT DOCUMENTS

AU 3855395 A1 6/1996

(Continued)

OTHER PUBLICATIONS

Axis communications, "Axis 2400/2401 Administration Manual Version 1.1", www.axis.com/techsup/cam_servers/cam_2400/index.htm, version 1.1.xx, part No. 16741, pp. 1-78, Jul. 1999.

(Continued)

*Primary Examiner* — Mohamed Brahim
(74) *Attorney, Agent, or Firm* — Lando & Anastasi, LLP

(57) ABSTRACT

A system for monitoring a space external to the system is disclosed. The system includes a microprocessor, a memory coupled to the microprocessor, a sensor configured to detect at least one environmental parameter of the space external to the system and configured to generate a sensor signal derived from the at least one detected environmental parameter of the space and at least one port for communicating with a network. The memory includes instructions for processing the sensor signal derived from the at least one environmental parameter of the space external to the system and the memory including a web server application. The at least one port is responsive to the microprocessor. The web server application is configured to provide a webpage associated with the sensor signal via the at least one port.

86 Claims, 12 Drawing Sheets

U.S. PATENT DOCUMENTS

| | | | |
|---|---|---|---|
| 4,747,041 A | 5/1988 | Engel et al. | |
| 4,751,648 A | 6/1988 | Sears, III et al. | |
| 4,816,208 A | 3/1989 | Woods et al. | |
| 4,823,290 A | 4/1989 | Fasack et al. | |
| 4,964,065 A | 10/1990 | Hicks et al. | |
| 5,043,807 A | 8/1991 | Rabii | |
| 5,061,916 A | 10/1991 | French et al. | |
| 5,086,385 A | 2/1992 | Launey et al. | |
| 5,097,328 A | 3/1992 | Boyette | |
| 5,109,278 A | 4/1992 | Erickson et al. | |
| 5,153,837 A | 10/1992 | Shaffer et al. | |
| 5,157,732 A | 10/1992 | Ishii et al. | |
| 5,168,171 A | 12/1992 | Tracewell | |
| 5,189,394 A | 2/1993 | Walter et al. | |
| 5,216,623 A | 6/1993 | Barrett et al. | |
| 5,220,522 A | 6/1993 | Wilson et al. | |
| 5,225,997 A | 7/1993 | Lederer et al. | |
| 5,229,850 A | 7/1993 | Toyoshima | |
| 5,262,758 A | 11/1993 | Nam et al. | |
| 5,289,275 A | 2/1994 | Ishii et al. | |
| 5,367,670 A | 11/1994 | Ward et al. | |
| 5,382,943 A | 1/1995 | Tanaka | |
| 5,395,042 A | 3/1995 | Riley et al. | |
| 5,400,246 A | 3/1995 | Wilson et al. | |
| 5,404,136 A | 4/1995 | Marsden | |
| 5,475,364 A | 12/1995 | Kenet | |
| 5,488,430 A | 1/1996 | Hong | |
| 5,491,511 A | 2/1996 | Odle | |
| 5,508,941 A | 4/1996 | Leplingard et al. | |
| 5,528,507 A | 6/1996 | McNamara et al. | |
| 5,548,659 A | 8/1996 | Okamoto | |
| 5,553,609 A | 9/1996 | Chen et al. | |
| 5,561,476 A | 10/1996 | Kershaw et al. | |
| 5,566,339 A | 10/1996 | Perholtz et al. | |
| 5,572,195 A | 11/1996 | Heller et al. | |
| 5,581,478 A | 12/1996 | Cruse et al. | |
| 5,586,202 A | 12/1996 | Ohki et al. | |
| 5,588,067 A | 12/1996 | Peterson et al. | |
| 5,589,764 A | 12/1996 | Lee | |
| 5,602,585 A | 2/1997 | Dickinson et al. | |
| 5,621,662 A | 4/1997 | Humphries et al. | |
| 5,634,002 A | 5/1997 | Polk et al. | |
| 5,659,470 A | 8/1997 | Goska et al. | |
| 5,664,202 A | 9/1997 | Chen et al. | |
| 5,715,160 A | 2/1998 | Plotke | |
| 5,731,832 A | 3/1998 | Ng | |
| 5,732,074 A | 3/1998 | Spaur et al. | |
| 5,742,762 A | 4/1998 | Scholl et al. | |
| RE35,793 E | 5/1998 | Halpern | |
| 5,768,430 A | 6/1998 | Takashima et al. | |
| 5,798,798 A | 8/1998 | Rector et al. | |
| 5,805,458 A | 9/1998 | McNamara et al. | |
| 5,812,055 A | 9/1998 | Candy et al. | |
| 5,818,725 A | 10/1998 | McNamara et al. | |
| 5,822,302 A | 10/1998 | Landry, Jr. et al. | |
| 5,829,130 A | 11/1998 | Miller | |
| 5,860,857 A | 1/1999 | Wasastjerna et al. | |
| 5,870,698 A | 2/1999 | Riedel et al. | |
| 5,872,931 A | 2/1999 | Chivaluri | |
| 5,892,440 A | 4/1999 | Bryan | |
| 5,905,867 A | 5/1999 | Giorgio et al. | |
| 5,926,210 A | 7/1999 | Hackett et al. | |
| 5,937,092 A | 8/1999 | Wootton et al. | |
| 5,937,097 A | 8/1999 | Lennon | |
| 5,949,974 A | 9/1999 | Ewing et al. | |
| 5,955,946 A * | 9/1999 | Beheshti et al. | 340/506 |
| 5,963,457 A | 10/1999 | Kanoi et al. | |
| 5,968,116 A | 10/1999 | Day, II et al. | |
| 5,974,237 A | 10/1999 | Shurmer et al. | |
| 5,978,594 A | 11/1999 | Bonnell et al. | |
| 5,978,912 A | 11/1999 | Rakavy et al. | |
| 5,987,614 A | 11/1999 | Mitchell et al. | |
| 5,991,885 A | 11/1999 | Chang et al. | |
| 6,001,065 A | 12/1999 | DeVito | |
| 6,006,171 A * | 12/1999 | Vines et al. | 702/184 |
| 6,052,750 A | 4/2000 | Lea | |
| 6,055,480 A | 4/2000 | Nevo et al. | |
| 6,057,834 A | 5/2000 | Pickover | |
| 6,058,434 A | 5/2000 | Wilt et al. | |
| 6,078,253 A | 6/2000 | Fowler | |
| 6,078,957 A | 6/2000 | Adelman et al. | |
| 6,081,606 A | 6/2000 | Hansen et al. | |
| 6,085,243 A | 7/2000 | Fletcher et al. | |
| 6,088,816 A | 7/2000 | Nouri et al. | |
| 6,100,806 A | 8/2000 | Gaukel | |
| 6,104,755 A | 8/2000 | Ohara | |
| 6,105,061 A | 8/2000 | Nakai | |
| 6,108,782 A | 8/2000 | Fletcher et al. | |
| 6,112,235 A | 8/2000 | Spofford | |
| 6,112,237 A | 8/2000 | Donaldson et al. | |
| 6,115,468 A | 9/2000 | De Nicolo | |
| 6,122,603 A | 9/2000 | Budike, Jr. | |
| 6,122,639 A | 9/2000 | Babu et al. | |
| 6,125,145 A | 9/2000 | Koyanagi et al. | |
| 6,138,078 A | 10/2000 | Canada et al. | |
| 6,138,249 A | 10/2000 | Nolet | |
| 6,139,177 A * | 10/2000 | Venkatraman et al. | 700/83 |
| 6,144,770 A | 11/2000 | Lennon | |
| 6,148,262 A | 11/2000 | Fry | |
| 6,157,943 A | 12/2000 | Meyer | |
| 6,160,584 A | 12/2000 | Yanagita | |
| 6,160,926 A | 12/2000 | Dow et al. | |
| 6,167,406 A | 12/2000 | Hoskins et al. | |
| 6,170,007 B1 | 1/2001 | Venkatraman et al. | |
| 6,173,323 B1 | 1/2001 | Moghe | |
| 6,175,866 B1 | 1/2001 | Holloway et al. | |
| 6,175,927 B1 | 1/2001 | Cromer et al. | |
| 6,177,884 B1 | 1/2001 | Hunt et al. | |
| 6,182,094 B1 | 1/2001 | Humpleman et al. | |
| 6,182,157 B1 | 1/2001 | Schlener et al. | |
| 6,189,109 B1 | 2/2001 | Sheikh et al. | |
| 6,195,018 B1 | 2/2001 | Ragle et al. | |
| 6,208,261 B1 | 3/2001 | Olstead | |
| 6,208,345 B1 | 3/2001 | Sheard et al. | |
| 6,215,404 B1 | 4/2001 | Morales | |
| 6,216,956 B1 | 4/2001 | Ehlers et al. | |
| 6,219,628 B1 | 4/2001 | Kodosky et al. | |
| 6,229,429 B1 | 5/2001 | Horon | |
| 6,236,332 B1 | 5/2001 | Conkright et al. | |
| 6,246,780 B1 | 6/2001 | Sato | |
| 6,259,956 B1 | 7/2001 | Myers et al. | |
| 6,266,721 B1 | 7/2001 | Sheikh et al. | |
| 6,271,845 B1 | 8/2001 | Richardson | |
| 6,281,790 B1 | 8/2001 | Kimmel et al. | |
| 6,282,546 B1 | 8/2001 | Gleichauf et al. | |
| 6,298,144 B1 | 10/2001 | Pucker, II et al. | |
| 6,304,900 B1 | 10/2001 | Cromer et al. | |
| 6,311,105 B1 | 10/2001 | Budike, Jr. | |
| 6,311,214 B1 | 10/2001 | Rhoads | |
| 6,324,644 B1 | 11/2001 | Rakavy et al. | |
| 6,329,792 B1 | 12/2001 | Dunn et al. | |
| 6,332,202 B1 | 12/2001 | Sheikh et al. | |
| 6,338,094 B1 | 1/2002 | Scott et al. | |
| 6,338,437 B1 * | 1/2002 | Kline et al. | 236/49.3 |
| 6,343,320 B1 | 1/2002 | Fairchild et al. | |
| 6,360,255 B1 | 3/2002 | McCormack et al. | |
| 6,363,421 B2 | 3/2002 | Barker et al. | |
| 6,363,422 B1 * | 3/2002 | Hunter et al. | 709/224 |
| 6,373,840 B1 | 4/2002 | Chen | |
| 6,374,296 B1 | 4/2002 | Lim et al. | |
| 6,375,614 B1 | 4/2002 | Braun et al. | |
| 6,381,700 B1 | 4/2002 | Yoshida | |
| 6,389,464 B1 | 5/2002 | Krishnamurthy et al. | |
| 6,396,534 B1 | 5/2002 | Mahler et al. | |
| 6,400,103 B1 | 6/2002 | Adamson | |
| 6,400,996 B1 | 6/2002 | Hoffberg et al. | |
| 6,402,691 B1 | 6/2002 | Peddicord et al. | |
| 6,404,348 B1 | 6/2002 | Wilfong | |
| 6,405,216 B1 | 6/2002 | Minnaert et al. | |
| 6,437,691 B1 | 8/2002 | Sandelman et al. | |
| 6,449,745 B1 | 9/2002 | Kim et al. | |
| 6,477,667 B1 | 11/2002 | Levi et al. | |
| 6,496,105 B2 | 12/2002 | Fisher et al. | |
| 6,505,086 B1 | 1/2003 | Dodd et al. | |
| 6,510,350 B1 | 1/2003 | Steen, III et al. | |
| 6,529,230 B1 | 3/2003 | Chong | |
| 6,529,936 B1 | 3/2003 | Mayo et al. | |

| | | | |
|---|---|---|---|
| 6,553,336 B1 | 4/2003 | Johnson et al. | |
| 6,553,418 B1 | 4/2003 | Collins et al. | |
| 6,591,279 B1 | 7/2003 | Emens et al. | |
| 6,611,866 B1 | 8/2003 | Goldman | |
| 6,640,145 B2 | 10/2003 | Hoffberg et al. | |
| 6,658,595 B1 | 12/2003 | Thamattoor | |
| 6,681,787 B2 | 1/2004 | Tinsley et al. | |
| 6,686,838 B1 | 2/2004 | Rezvani et al. | |
| 6,714,977 B1 | 3/2004 | Fowler et al. | |
| 6,718,364 B2 | 4/2004 | Connelly et al. | |
| 6,756,998 B1 | 6/2004 | Bilger | |
| 6,801,940 B1 | 10/2004 | Moran et al. | |
| 6,829,630 B1 | 12/2004 | Pajak et al. | |
| 6,990,513 B2 | 1/2006 | Belfiore et al. | |
| 7,051,096 B1 | 5/2006 | Krawiec et al. | |
| 7,159,022 B2 * | 1/2007 | Primm et al. | 709/224 |
| 7,207,041 B2 | 4/2007 | Elson et al. | |
| 7,330,886 B2 | 2/2008 | Childers et al. | |
| 7,392,309 B2 | 6/2008 | Childers et al. | |
| 7,529,838 B2 | 5/2009 | Primm et al. | |
| 2001/0005894 A1 | 6/2001 | Fukui | |
| 2001/0047213 A1 | 11/2001 | Sepe, Jr. | |
| 2001/0047410 A1 | 11/2001 | Defosse | |
| 2001/0052006 A1 | 12/2001 | Barker et al. | |
| 2001/0055965 A1 | 12/2001 | Delp et al. | |
| 2002/0003575 A1 | 1/2002 | Marchese | |
| 2002/0023258 A1 | 2/2002 | Elwahab et al. | |
| 2002/0041603 A1 | 4/2002 | Kato | |
| 2002/0043969 A1 | 4/2002 | Duncan et al. | |
| 2002/0071031 A1 | 6/2002 | Lord et al. | |
| 2002/0072868 A1 | 6/2002 | Bartone et al. | |
| 2002/0083378 A1 | 6/2002 | Nickels | |
| 2002/0112054 A1 | 8/2002 | Hatanaka | |
| 2002/0124081 A1 | 9/2002 | Primm et al. | |
| 2002/0152298 A1 | 10/2002 | Kikta et al. | |
| 2002/0161885 A1 | 10/2002 | Childers et al. | |
| 2002/0174223 A1 | 11/2002 | Childers et al. | |
| 2003/0098789 A1 | 5/2003 | Murakami et al. | |
| 2003/0204756 A1 | 10/2003 | Ransom et al. | |
| 2004/0160897 A1 | 8/2004 | Fowler | |
| 2004/0163102 A1 | 8/2004 | Fowler et al. | |
| 2007/0088823 A1 | 4/2007 | Fowler et al. | |
| 2009/0064046 A1 | 3/2009 | Childers et al. | |
| 2009/0121860 A1 | 5/2009 | Kimmel et al. | |
| 2009/0164031 A1 | 6/2009 | Johnson et al. | |

FOREIGN PATENT DOCUMENTS

| | | |
|---|---|---|
| AU | 5601198 A1 | 7/1998 |
| AU | 0016673 A5 | 6/2000 |
| AU | 777375 | 10/2004 |
| CA | 2300053-AA | 2/1999 |
| CA | 2310275-AA | 6/1999 |
| CA | 2328939-AA | 9/1999 |
| CA | 2395450 | 5/2001 |
| CN | 87100353 A | 9/1988 |
| CN | 1294350 A | 5/2001 |
| EP | 0444997 B1 | 2/1991 |
| EP | 0 591 585 A1 | 4/1994 |
| EP | 0738065 A1 | 3/1996 |
| EP | 0744112 A1 | 11/1996 |
| EP | 0859489 A2 | 1/1998 |
| EP | 0978780 A1 | 8/1998 |
| EP | 0917034 A1 | 10/1998 |
| EP | 0917034 B1 | 10/1998 |
| EP | 0963076 A3 | 5/1999 |
| EP | 0964551 A1 | 6/1999 |
| EP | 0 927 933 A2 | 7/1999 |
| EP | 0977112 A2 | 7/1999 |
| EP | 0956680 A1 | 11/1999 |
| EP | 1014622 A2 | 12/1999 |
| EP | 1 990 986 A | 4/2000 |
| EP | 0990986 A2 | 4/2000 |
| EP | 0992100 A2 | 4/2000 |
| EP | 1002268 A1 | 5/2000 |
| EP | 1 009 130 A | 6/2000 |
| EP | 1032884 A1 | 9/2000 |
| EP | 1 049 291 A2 | 11/2000 |
| EP | 1115264 A2 | 12/2000 |
| EP | 1124301 A2 | 12/2000 |
| EP | 1 096 724 A | 5/2001 |
| EP | 1 150 188 A2 | 10/2001 |
| EP | 1142289 A1 | 10/2001 |
| EP | 1 178 628 A2 | 2/2002 |
| GB | 9826895 A | 1/1999 |
| GB | 9913682 A | 8/1999 |
| GB | 2335124 A | 9/1999 |
| GB | 2343036 A | 4/2000 |
| GB | 2344718 A | 6/2000 |
| GB | 2351205 A | 12/2000 |
| GB | 2344718 B | 1/2001 |
| GB | 2355163 A | 4/2001 |
| GB | 2359369 A | 8/2001 |
| GB | 2361156 A | 10/2001 |
| HU | 9300145 U0 | 8/1993 |
| JP | 3099398 A2 | 4/1991 |
| JP | 5040889 A2 | 2/1993 |
| JP | 6105376 A2 | 4/1994 |
| JP | 6119581 A2 | 4/1994 |
| JP | 8307541 A2 | 11/1996 |
| JP | 11164035 A | 6/1999 |
| JP | 11219388 A2 | 8/1999 |
| JP | 11338666 | 12/1999 |
| JP | 2000092092 A2 | 3/2000 |
| JP | 2000134606 A2 | 5/2000 |
| JP | 2000151606 A2 | 5/2000 |
| JP | 2000209204 A2 | 7/2000 |
| JP | 2000278773 A2 | 10/2000 |
| TW | 0443058 B | 6/2001 |
| TW | 0448349 B | 8/2001 |
| WO | WO-95/21506 | 8/1995 |
| WO | WO-96/15615 | 5/1996 |
| WO | WO-97/30879 | 8/1997 |
| WO | 9804067 A1 | 1/1998 |
| WO | WO-98/01838 | 1/1998 |
| WO | WO-98/26541 | 6/1998 |
| WO | WO-99/08183 | 2/1999 |
| WO | WO 99/15950 | 4/1999 |
| WO | WO-99/27456 | 6/1999 |
| WO | WO-99/45445 | 9/1999 |
| WO | WO-00/35177 | 6/2000 |
| WO | WO-00/39724 | 7/2000 |
| WO | WO-00/54557 | 9/2000 |
| WO | WO-00/73866 A1 | 12/2000 |
| WO | WO-00/79500 A1 | 12/2000 |
| WO | WO-00/79500 C2 | 12/2000 |
| WO | WO-01/01366 A2 | 1/2001 |
| WO | WO-01/08396 | 2/2001 |
| WO | WO-01/27763 A1 | 4/2001 |
| WO | 0131849 | 5/2001 |
| WO | WO-01/57631 A1 | 8/2001 |
| WO | WO-01/61665 A2 | 8/2001 |
| WO | WO-01/69405 A1 | 9/2001 |
| WO | WO-01/69405 C1 | 9/2001 |
| WO | WO 01/69504 A1 | 9/2001 |
| WO | WO-01/79935 A1 | 10/2001 |
| WO | WO-01/57477 C1 | 11/2001 |
| WO | WO-01/82028 A2 | 11/2001 |
| WO | WO-01/93042 A2 | 12/2001 |
| WO | WO-01/93508 A1 | 12/2001 |
| WO | WO-01/97907 A2 | 12/2001 |
| WO | WO-01/99402 A2 | 12/2001 |
| WO | WO-02/01877 A1 | 1/2002 |
| WO | WO-02/11391 A2 | 2/2002 |
| WO | 0233980 | 4/2002 |
| WO | WO-02/37280 A2 | 5/2002 |
| WO | WO-02/47044 | 6/2002 |
| WO | WO-02/47369 A1 | 6/2002 |
| WO | WO-02/48830 A2 | 6/2002 |
| WO | WO-02/49285 A1 | 6/2002 |
| WO | 02060124 | 8/2002 |
| WO | 02093403 | 11/2002 |
| WO | 02099683 | 12/2002 |

OTHER PUBLICATIONS

Fossum, E.R. "CMOS image sensors; electronic camera-on-a-chip", IEEE Transactions on Electron Devices, vol. 44, iss. 10, pp. 1689-1698, Oct. 1997.

Axis Communications, "Axis 200+ and 240 Camera Server: User's Guide", www.axis.com/techsup/cam_servers/cam_240/index.htm pp. 1-38, Jan. 1999.

Axis Communications, "Network Camera Developments Enable Live Web Imaging", Axis 2100 white paper, www.axis.com/products/videos/camera/documentation.htm , pp. 1-12, Nov. 1999.

Sinetica Corp: "Newsletter, Issue One 99", Sinetica, UK, www.sinetica.co.uk, Feb. 1999, XP002160504, 4 pp.

Sinetica Corp: "Netcom TH. Advanced SNMP Agent with Web Broser Support", Sinetica, UK, www.sinetica.co.uk, Apr. 2000, XP002160505, 2 pp.

International Search Report from corresponding International Application No. PCT/US00/29689 (dated Feb. 28, 2001).

Office Action from corresponding Canadian Patent Application No. 2,395,450, dated May 2, 2008.

International Search Report from International Application No. PCT/US02/09179 (dated Aug. 22, 2002).

International Search Report from International Application No. PCT/US02/09178 (dated Sep. 4, 2002).

International Search Report from International Application No. PCT/US02/02326 (dated Jan. 10, 2003).

European Search Report from European Patent Application No. EP 04 75 0067 (dated Apr. 24, 2007).

Duran et al., "Virtual personal computers and the portable network," IEEE Proceedings of Inter. Performance, Computing, and Communications, IPCCC'99, p. 52-56, Feb. 1999.

Hochhauser, M., "Netbotz Wallbotz 400 is the next best thing to being there", CMP Media, Inc., Network Computing, v 13, n. 2, p. 1-2, Jan. 2002.

* cited by examiner

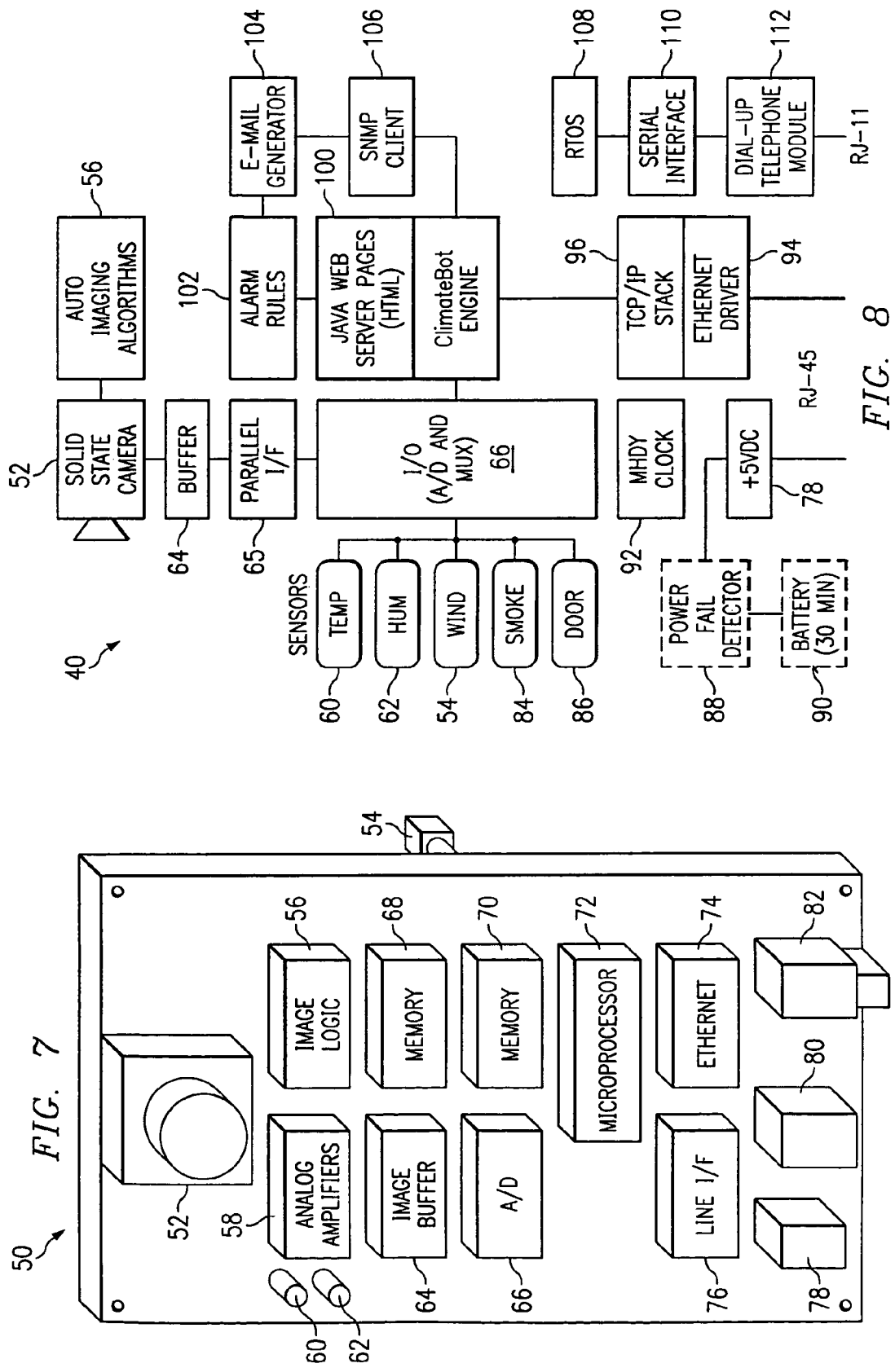

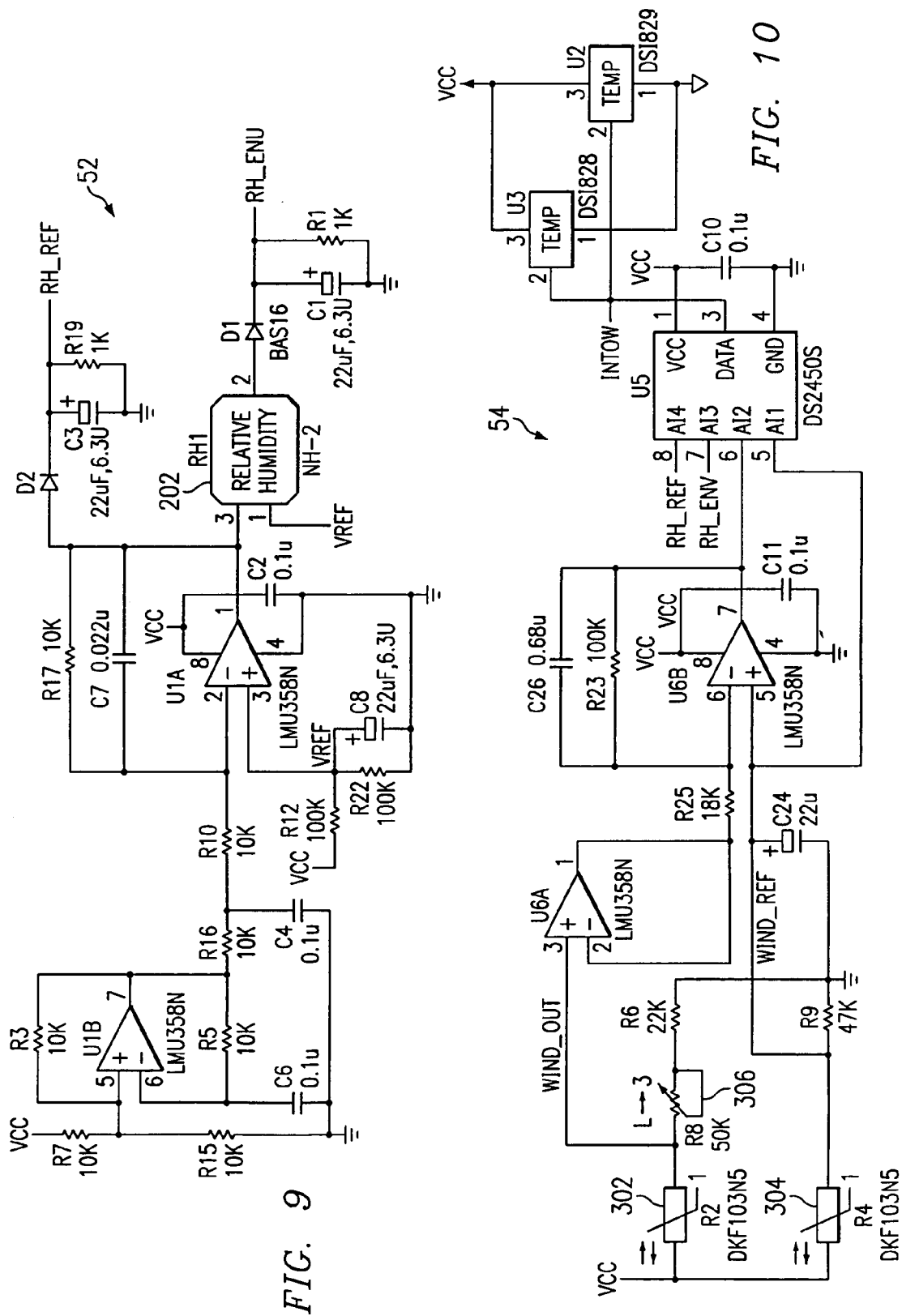

FIG. 13A
FIG. 13C
270
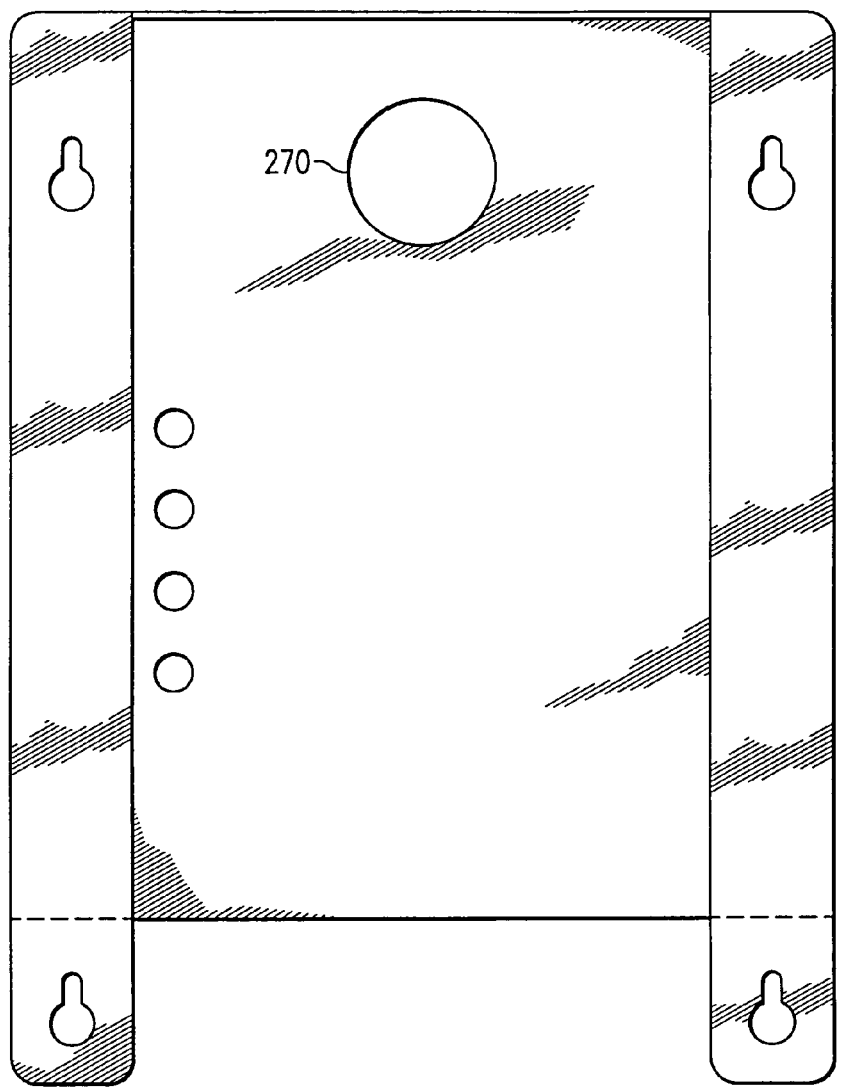
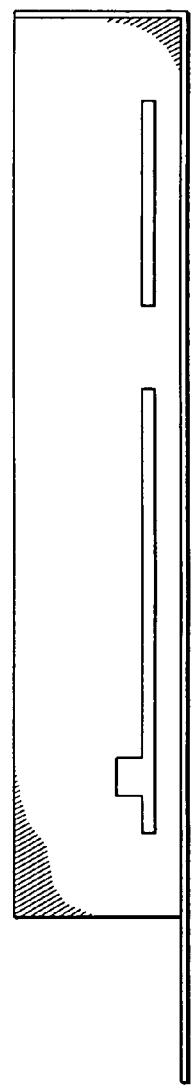
FIG. 13B
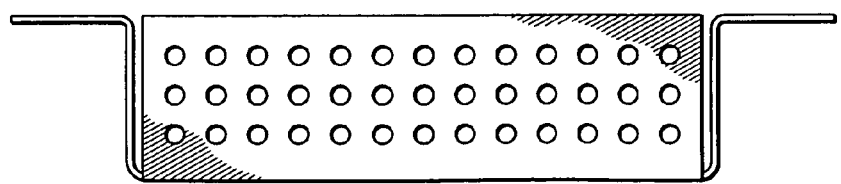

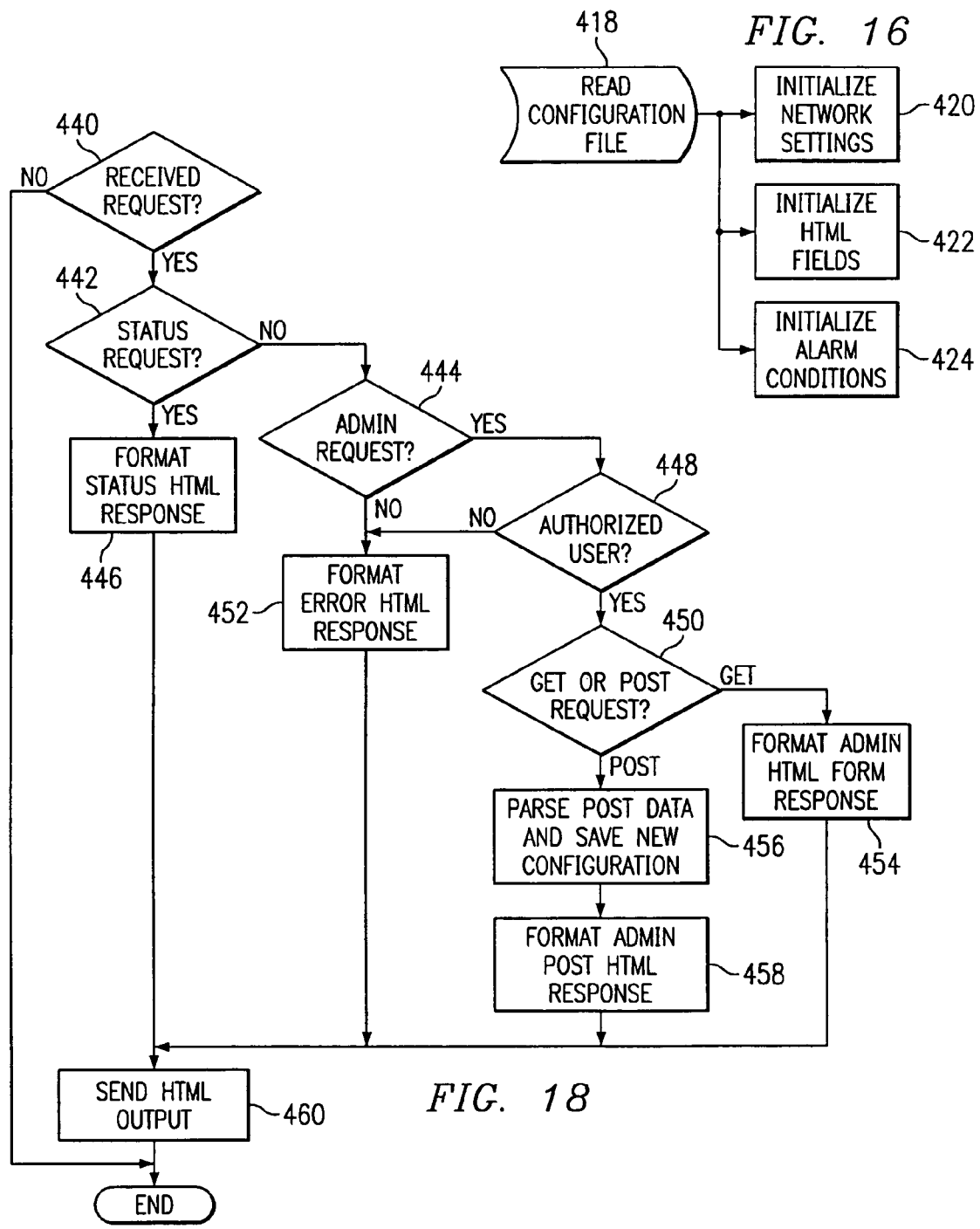
FIG. 16
FIG. 18
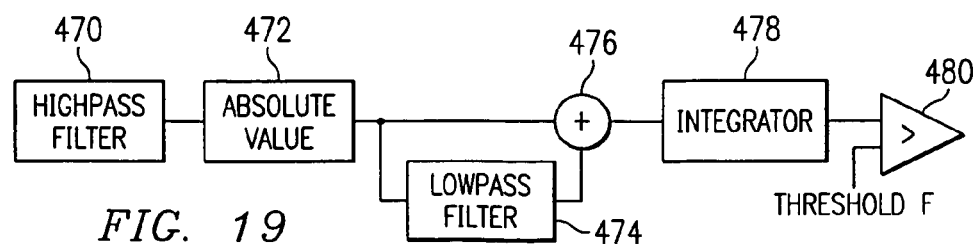
FIG. 19

| NetBotz CoreTex – | | | | |
|---|---|---|---|---|

URL: http://www.coretex.com/~thompson

| Date, time: | 7/22/99 08:00 |
|---|---|
| Temp (C): | 22.1 |
| Temp (F) | 72.6 |
| Humidity (%) | 55 |
| Air Flow (0-100) | 6 |
| Smoke Alarm Sound | Off |

| Limit Settings | High | Low |
|---|---|---|
| Temperature (C) | 23 | 15 |
| Humidity (%) | 75 | 35 |
| Air Flow (0-100) | 1 | 90 |
| Smoke Alarm | On | On |

Equipment report (launched Bot returns):

| Server "High Plains" Compaq | Status | Alarms? | Limit High | Limit Low |
|---|---|---|---|---|
| CPU Temp F | 77 | | 120 | 50 |
| CPU Fan | 1200 | | 1400 | 1200 |
| Disk Status | On | | Off | Off |
| Router "Franks Favorite" 41B | | | | |
| Temp | 85 | | 90 | 110 |
| Data Lines Up? | On | | | Off |
| Server "High Plains" Compaq | | | | |
| CPU Temp | 80 | | 120 | 50 |
| CPU Fan | 1300 | | 1400 | 1200 |
| Disk Status | On | | Off | Off |
| UnPowerSup "Big Bertha" ACX 500 | | | | |
| On-line? | True | | False | False |
| Charge capacity (%) | 95 | Yes | 100 | 99 |
| Server "Old Guy" Dell 4000 | | | | |
| CPU Temp | 90 | | 120 | 50 |
| Disk Status | On | | Off | Off |

Destinations for Alarm e-mail and paging

| E-Mail | |
|---|---|
| Primary: | itstaff@coretex.com; gerryc@flash.net |
| Secondary: | jnorton@flash.net |
| Paging: | 5127896565@mail.att.net |

*FIG. 17*

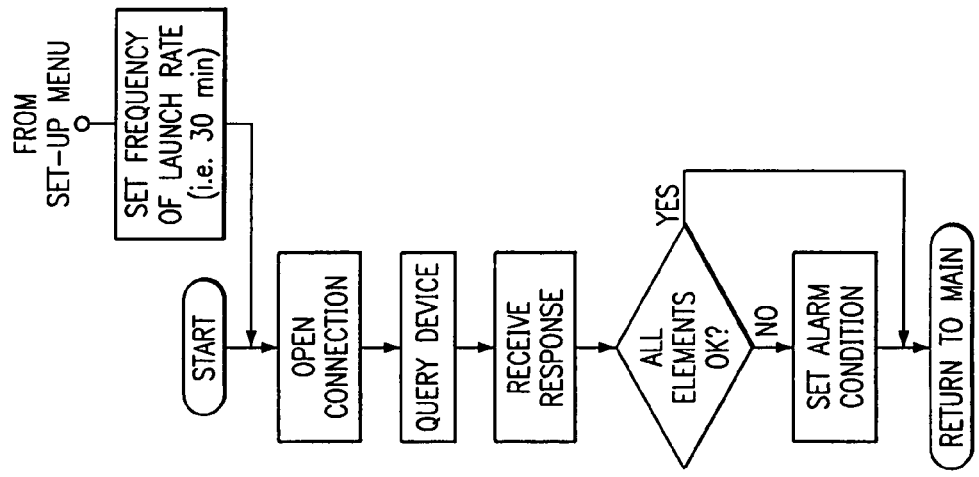

FIG. 22

Typical Scheduled E-mail Report
From: Abilene Server Room [SMTP:abilene@coretex.net]
Sent: Friday, July 09, 1999 08:00 AM
To: itstaff@coretex.com; hjones@flash.net
Subject: ClimateBot Report: Abilene Room Conditions Temperature: 18C (64F)
Humidity: 55%
Air Flow: 50
Condition: within limits Current Limit settings:
Temp (C) high: 20    Temp low: 15
Humidity high: 60    Humidity low: 40
Air flow high: 08    Air flow low: 00

To change limits and reporting go to: http://coretex.com/it/abilene1

FIG. 21A

Alarm Message (Typical)
From: Abilene Server Room [SMTP:abilene@coretex.net]
Sent: Friday, July 09, 1999 10:30 AM
To: itstaff@coretex.com; hjones@flash.net
Subject: Abilene Room Conditions Temperature: 25C (75F) Above limits
Humidity: 55%
Air Flow: 50
Condition: Over temperature alarm To change limits and reporting go to: http://coretex.com/it/abilene1

FIG. 21B

METHOD AND SYSTEM FOR MONITORING COMPUTER NETWORKS AND EQUIPMENT

CO-PENDING APPLICATIONS

The present application is a continuation of U.S. patent application Ser. No. 09/429,504, filed on Oct. 27, 1999 and entitled "METHOD AND SYSTEM FOR MONITORING COMPUTER NETWORKS AND EQUIPMENT," which is incorporated by reference herein in its entirety.

TECHNICAL FIELD OF THE INVENTION

The present invention relates generally to computer network and equipment monitoring systems and methods and, more particularly, to computer network monitoring systems that can be accessed locally or remotely. Even more particularly, the present invention relates to a computer network and equipment monitoring system that can provide real-time status of environmental conditions, alarm functions, and real-time video imaging of a space or equipment being monitored over a global network, such as the internet.

BACKGROUND OF THE INVENTION

Data traffic on networks, particularly on the internet, has increased dramatically over the past several years, and this trend will continue with the rapid growth of e-commerce and other services on the internet requiring greater bandwidth. With this increase in data traffic on networks, there has been a corresponding increase in the number of computer equipment rooms, known as "server rooms," used to house the equipment necessary to support data traffic routing. Furthermore, the increasing dependency of companies on their internet presence has created an urgency to keep the server rooms up and running at all times. Industry estimates show that there are over 400,000 such rooms currently in existence in the United States.

The growth in internet traffic has prompted many businesses to construct a server room to allow their employees to access internet information or enable e-commerce and store data. Once viewed as a goal, continuous server up time has become a necessity. Keeping track of numerous computers, along with associated bridges, routers, backup power supplies, etc., can be a formidable task. A large company with server rooms in more than one city might well be faced with spending thousands of dollars on software packages to keep their equipment running. Prices of $1,000 per computer are common. Dedicated technicians are also needed to monitor network equipment and issue work orders to repair failed units.

While reliable, modern computer systems cannot tolerate excess heat, dust or humidity. Heat can rapidly cause equipment deterioration. Failure of CPU cooling fans can reduce equipment lifetime to days or hours. A single high-speed LAN (local area network) failure can cause slow system response. These and other such failures within the equipment in a server room occur routinely and can cause great disruption to a business.

Solutions do currently exist for monitoring computer networks and equipment to prevent such failures. However, these solutions are primarily targeted at high-end, very large systems such as those used by large corporations or institutions that have large budgets to support equipment monitoring. For example, Hewlett-Packard provides a high-end monitoring package with a starting price of around $250,000. In the middle tier, smaller monitoring solutions can be had for approximately $20,000. Some of these systems only permit inspection of devices on a local basis. Others permit a technician to inspect geographically diverse installations from a central console. However, all of these solutions are expensive to implement and complex and difficult to maintain and train personnel to use them.

As a result, small to medium companies having small to medium networks are left in the position of requiring a means to monitor and maintain their computer network equipment from failing while not having the resources to afford the high-priced solutions currently available. Many firms cannot afford a high-end solution or simply do not have the time and resources to train their IT personnel to learn and use complex systems. Instead, the common monitoring method in many such companies is user complains to the IT manager to indicate when a problem has occurred. The idea is that someone in the organization will notice a failure and call for repairs before damage can be done. The reality, however, is that most IT managers have suffered some form of server room damage from excess heat or other physical phenomenon or simply just failure.

This is especially true for companies having multiple server rooms and that have concerns about routine access to each of these rooms. For example, most IT managers would like some form of remote access for determining the status of a server room. Additionally, concerns exist with current solutions regarding the manpower intensiveness of these solutions. Most network monitoring solutions can consume a full- or part-time employee. The financial justification for these systems is, therefore, difficult because network equipment typically fails yearly, or on a disaster basis, and the cost of recovery is seen as less than that of maintaining a full-time employee to routinely monitor the equipment.

Similar concerns exist for monitoring rack-mounted components such that individual components within a rack can be monitored remotely. Also, current monitoring solutions do not provide for video imaging of remote server locations over a network. Computer equipment is typically placed in server rooms for two reasons: security and environmental control. Remote video imaging of a server room over a network can provide for maintaining security of the equipment despite the lack of a physical presence on site.

A typical computer room can house hundreds of devices, ranging from expensive server grade computers to bridges, routers, uninterruptable power supplies and telephone equipment. A server room's environment requires monitoring because out of limit environmental variables can eventually affect the equipment in the room. For example, high temperatures, humidity (for example, from water leaks), or lack of air flow can detrimentally affect the equipment. Similarly, alarms, such as smoke and fire alarms, or the status of room openings, are important to determine. While the expense of replacing server room components if they fail is great, currently existing monitoring solutions are not cost effective for smaller-sized companies to implement despite the potential costs of such losses.

SUMMARY OF THE INVENTION

Therefore, a need exists for a method and system for monitoring computer networks and equipment that can fit into different levels of information technology ("IT") management, from very large companies with large network operation centers and deployed worldwide networks, to small companies with one internet server.

A further need exists for a computer network and equipment monitoring method and system that can be implemented in a small space, is simple to install, maintain and manage, and is reliable. Such a system can be configured with no moving parts, such as the keyboard, disk drives or monitors of conventional computer systems.

An even further need exists for a computer network and equipment monitoring method and system that can provide access and control through a global network such as the internet and that are capable of processing HTTP, HTML, MIME, TeleNet, TCP/IP and SNMP, standards.

A still further need exists for a computer network and equipment monitoring method and system that can provide a video image of a room upon the occurrence of a pre-set condition, such as a door opening.

Still further, a need exists for a computer network and equipment monitoring method and system that can perform continuous computer network monitoring, monitoring of the environmental conditions of a computer room, and an evaluation of individual components, and automatically provide a report in the event of an out-of-limit condition. Such a system and method should be able to determine the power status of a device, use SNMP, Bios API, or Windows NT (or similar operating systems) to determine accessory conditions, assemble a complete report, and send email or pager messages on out-of-limit conditions.

An even further need exists for a computer network and equipment monitoring method and system that can communicate to personnel monitoring the system via the internet through, for example, an Ethernet 10-base-T Category 3 or Category 5 wire, or through an optional dial-up telephone line for network down conditions.

A still further need exists for a computer network and equipment monitoring method and system that can measure the physical conditions of a server room, such as room temperature, humidity, and/or air flow, and detect whether a smoke alarm has gone off.

Furthermore, a need exists for a computer network and equipment monitoring method and system that can report equipment or environmental conditions via the internet through a Web page, email or through a pager or a telephone call.

A still further need exists for a computer network and equipment monitoring method and system that can provide a downloadable memory function to make adding or changing functionality simple. IT managers can thus modify or even invent tasks for the system. Administration can be via straightforward HTML tables requiring no training.

A further need exists for a computer network and equipment monitoring method and system that can provide a micro web-server powered through an Ethernet cable, thus eliminating the need for the micro web server to have a wall-supplied power source.

Moreover, a need exists for a computer network and equipment monitoring system and method with the ability to control an external, high-voltage load from either a remote or local location.

In accordance with the present invention, a computer network and equipment monitoring method and system are provided that substantially eliminate or reduce disadvantages and problems associated with previously developed systems and methods for monitoring computer networks and equipment.

More specifically, the present invention provides a method and system for monitoring a space and its contents over a network. The system can include an embedded microprocessor, such as Java microprocessor, to provide processing and network connectivity capability, and sensors to detect physical parameters associated with the space. The sensors can generate one or more sensor signals representative of the detected physical parameters. An analog-to-digital converter can convert the sensor signals to a digital format and can provide corresponding digital signals to the microprocessor.

The system further includes instructions for processing the sensor signals and corresponding digital signals. An alarm signal can be generated when any of the physical parameters exceeds a corresponding threshold value. The system of the present invention can have at least one input/output port for communicating with the network and one or more memory modules for storing system data. The system of this invention can have a network-based interface for providing programming instructions to the microprocessor and for receiving monitoring status and alarm information from the system. The interface can be an HTML interface. A power source provides power to the system.

The present invention provides a technical advantage of a computer network and equipment monitoring method and system that that can be implemented in a small space, is simple to install, maintain and manage, and is reliable.

A further technical advantage of the present invention is its ability to provide access and control through a global network such as the internet and the capability to process HTTP, HTML, MIME, and SNMP standards.

An even further technical advantage of the present invention is the ability to provide a video image of a room upon the occurrence of a pre-set condition, such as a door opening or whenever the website is addressed.

Still further, a technical advantage of the present invention is the ability to perform continuous computer network monitoring, to monitor the environmental conditions of a computer room, and to evaluate individual network components and automatically provide a report in the event of an out-of-limit condition.

A still further technical advantage provided by the present invention is the ability to communicate with personnel monitoring the system via the internet or an intranet.

An even further technical advantage of the present invention is the ability to report equipment or environmental conditions via the internet through a Web page, email or through a pager or a telephone call.

A still further a technical advantage of this invention is a downloadable memory function to make adding or changing functionality simple.

Still further, a technical advantage provided this invention is a micro web-server powered through an Ethernet cable, thus eliminating the need for the micro web server to have a wall-supplied power source.

Moreover, a technical advantage of the present invention is a computer network and equipment monitoring system and method with the ability to control an external load from either a remote or local location.

It is to be understood that both the foregoing general description and the following detailed description are exemplary and explanatory only and are not restrictive of the invention as claimed.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 7 is a conceptual block diagram of an embodiment of the computer network and equipment monitoring system of the present invention;

FIG. 8 is a simplified box diagram of the architecture of the embodiment of the present invention shown in FIG. 6;

FIG. 9 is a circuit schematic of humidity sensor 52 of FIG. 7;

FIG. 10 is a circuit diagram of air flow sensor 54 of FIG. 7;

FIGS. 13A, 13B and 13C show front, top, and side views, respectively, of the sheet metal housing of an embodiment of the present invention;

FIG. 16 is a flow chart diagramming the steps of the method of this invention for retrieving configuration settings;

FIG. 17 shows a typical HTML response to a status request as provided by the method and system of this invention;

FIG. 18 is a flow chart diagramming the response of the system and method of this invention to an HTTP request;

FIG. 19 is a block diagram illustrating the signal processing steps of the method of this invention;

FIGS. 21A and 21B show a typical alarm email and scheduled report email generated using the method and system of the present invention; and FIG. 22 represents a flow chart of the system operation of the present invention.

DETAILED DESCRIPTION OF THE INVENTION

Preferred embodiments of the present invention are illustrated in the FIGURES, like numerals being used to refer to like and corresponding parts of the various drawings.

The method and system of the present invention can provide a simple, reliable, easy to manage and low-cost means for monitoring a network and the physical environment housing the network. Various embodiments of the present invention can provide one or all of physical environment monitoring, monitoring of individual component parts, video imaging of the physical space housing a server system, internet or Intranet connectivity and telephone-line notification. The method and system of the present invention can be implemented in data networks of very large companies with large network operation centers and deployed worldwide networks, to small companies with one internet server or a single computer room. In particular, the low cost, low maintenance, internet connectivity, and ease of use of the method and system of the present invention make it ideally suited for the currently under-served smaller network market.

Figure 1:
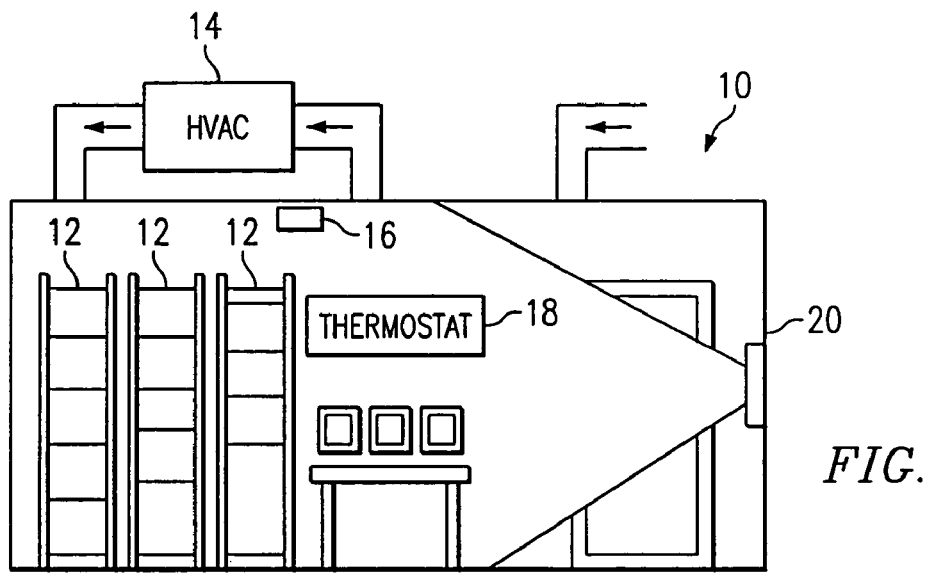
FIG. 1 shows a typical server room layout that can be monitored using the method and system of the present invention.

FIG. 1 shows a typical server room layout that can be monitored using the method and system of the present invention. Server room 10 includes racks 12, which can hold different types of devices ranging from expensive server-grade computing units to bridges, routers, uninterruptable power supplies, and telephone equipment. Communications lines to connect to the internet and to a telephone system can connect into racks 12. Typically, a heating, ventilation and air conditioning system 14 provides recirculation of cooled air through server room 10 and can be controlled by thermostat 18. Server room 10 can also include a smoke alarm 16 to indicate the presence of a fire or smoking equipment. Different embodiments of the system of the present invention can be used to monitor server room 10 by being placed, for example, on wall 20 in a position to monitor the contents of server room 10.

Figure 2:
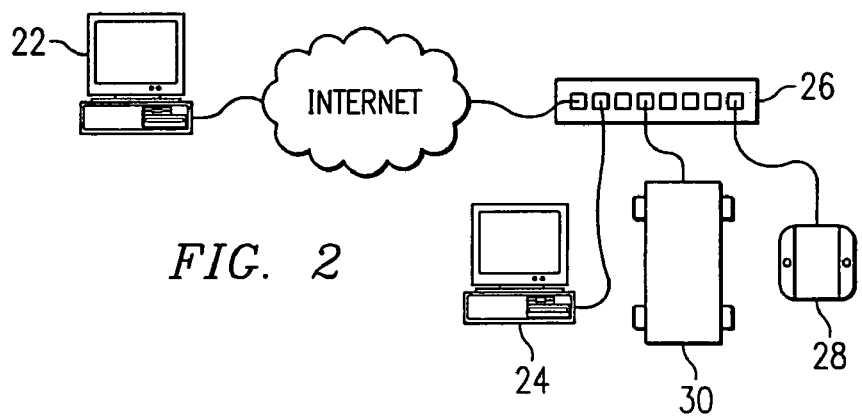
FIG. 2 is a conceptual diagram showing a typical installation of an embodiment of the system of the present invention.

FIG. 2 is a conceptual diagram showing a typical installation of an embodiment of the system of the present invention. Climate bot 28, comprising one embodiment of the method and system of the present invention, can connect via a standard ethernet connection to bridge router 26. Ethernet connection to bridge router 26 can be an RJ45 to category 5 network wiring connector. Company web server 30 is connected to bridge router 26 and, through bridge router 26, can be connected to an internal client 24 on a company intranet or to an external client 22 via the internet. External client 22 can connect to climate bot 28 via a dial-up internet connection or other internet connection to obtain the status of server room 10 monitored parameters. In a similar manner, internal client 24 can access climate bot 28 VIA an internal company intranet connection through bridge router 26. FIG. 2 illustrates the local and remote access capabilities of the method and system of the present invention implemented as climate bot 28.

Many modern computers and computer peripheral equipment have the capability to permit monitoring of various system parameters, such as the on/off status of fans, processor temperatures, various system voltages, and other system parameters. With the appropriate software and communications links, such systems can be queried for these various parameters. The method and system of the present invention can perform these monitoring functions. The system of the present invention can comprise a small, low-cost, self-contained, simple-to-install unit made from industrial construction materials. Various embodiments of the present invention can provide various levels of monitoring, notification, and video imaging. The embodiments of the present invention can be wall-mounted within server room 10 of FIG. 1 in a position to both monitor the environmental parameters of server room 10 and to connect to a company's computer network to monitor various parameters of the computer network.

The embodiments of the present invention can comprise a complete and self-contained "micro" web-server with its own URL and static IP address on the internet, and can connect to a company's network, and through that computer network to the internet, via a standard connector such as an Ethernet connector. A unit comprising the system of the present invention can have its own worldwide web address and deliver a web page to users accessing the unit. The various embodiments of the present invention can be HTML compliant, provide email and/or phone notification, and essentially comprise an internet site.

Figure 3:
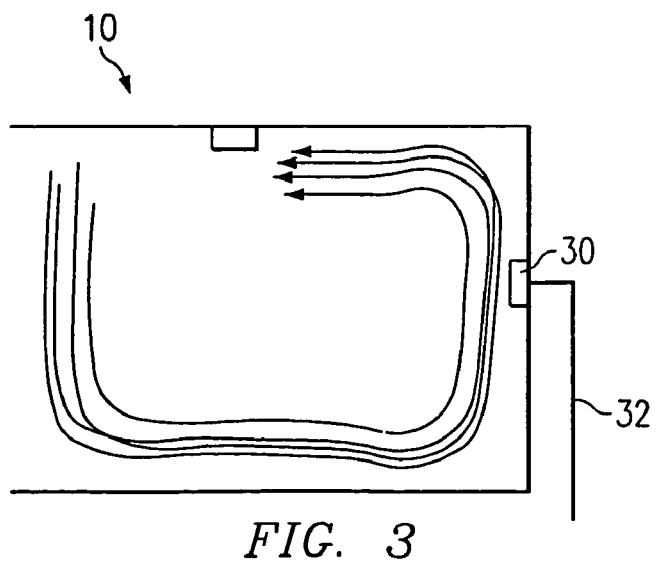
FIG. 3 illustrates the capabilities of one embodiment of the computer network and equipment monitoring system of the present invention.

FIG. 3 illustrates the capabilities of one embodiment of the computer network and equipment monitoring system of the present invention. Climate bot 30 of FIG. 3 can provide continual monitoring of a server room 10's environmental parameters. For example, climate bot 30 can provide continuous monitoring of temperature, humidity, air flow, and the presence of smoke within server room 10. Climate bot 30 can report the status of the parameters that it is monitoring via a web page, email, or paging. Internet connection 32 can connect climate bot 30 directly to the internet or to another computer network and through that computer network to the internet. A user can set alarm points for the parameters monitored by climate bot 30 using a simple HTML web page interface.

Climate bot 30 of FIG. 3 can be configured as only an environmental monitoring system. However, climate bot 30 can be upgraded to include agent ("bot") functionality. Agents are software objects that can be used to investigate and query individual components of the computer network to determine their status and some physical parameters.

Figure 4:
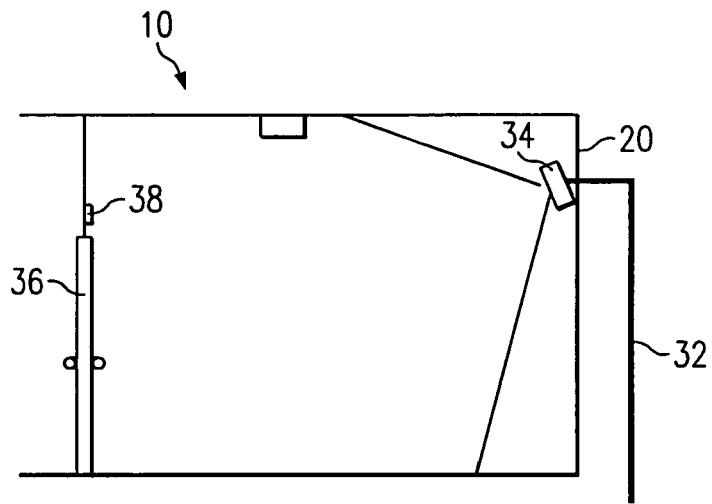
FIG. 4 illustrates the capabilities of another embodiment of the method and system of the present invention.

FIG. 4 illustrates the capabilities of another embodiment of the computer network and equipment monitoring method and system of the present invention. Video climate bot 34 incorporates a video imaging system, such as a CMOS imager, to provide images of server room 10 Video climate bot 34 can be mounted on wall 20 so as to provide an unobstructed view of the entrance to server room 10, or any other portion of server room 10. Video climate bot 34 can have all of the same functionality of climate bot 30 of FIG. 3, but can also provide video imaging circuitry and circuitry for sensing an external influence, such as the opening of door 36. A sensor 38 can monitor door 36 and provide a signal to video climate bot 34 upon, for example, the opening of door 36. Sensor 38 can be any type of sensor, such as a magnetic switch, that can provide a signal upon the occurrence of a preset condition. Sensor 38 can be connected to video climate bot 34 by hard wiring, or through a wireless interface.

In one embodiment of the present invention, video climate bot 34 can be set to receive an input signal from sensor 38 indicating that door 36 has been opened. Video climate bot 36 can be configured to wait a pre-set amount of time (for example, one second) following the opening of door 36 and take a video image of server room 10. The video image can be transmitted to a system administrator to indicate the presence of an external influence, such as a person, entering server room 10. Video climate bot 34 can thus be used as an additional security measure and record-keeping device to track personnel access into server room 10. Video climate bot 34 and sensor 38 can also be used to indicate the presence of other external influences beyond personnel access to server room 10.

Video climate bot 34 can be slightly larger than climate bot 30 of FIG. 3 to accommodate a video imaging system. Each time that a web page maintained by video climate bot 34 is accessed, a new image can be captured and transmitted to the user. Video climate bot 34 can also provide streaming video or truce frame (still frame) over to the user.

Climate bot 30 of FIG. 3 and video climate bot 34 of FIG. 4 can both provide information relating to the various parameters they are monitoring through a simple HTML interface. Both units can be accessed, configured, and maintained via the internet using standard HTML. Unlike in prior art computer network monitoring systems, extensive personnel training is therefore not required. Video climate bot 34 can provide the administrator of a large network system with various geographically distinct server rooms 10 with the ability to tour the server rooms remotely, via the internet or an intranet, and be able to see an image of each of those server rooms. The system administrator can likewise monitor the environmental conditions in each of the server rooms quickly and efficiently, without having to physically visit each room.

Figure 5:
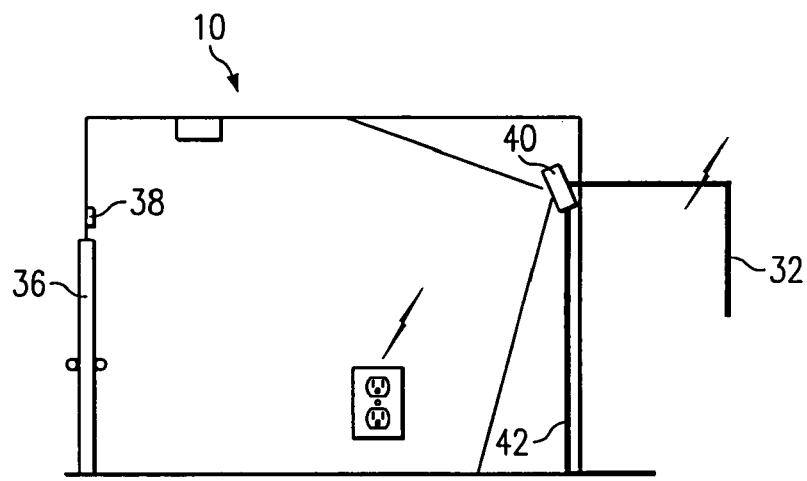
FIG. 5 illustrates the capabilities of another embodiment of the method and system of the present invention.

FIG. 5 illustrates the capabilities of another embodiment of the computer network and equipment monitoring method and system of the present invention. Net bot 40 can have the same functionality as video climate bot 34 of FIG. 4 and can additionally provide the capability to detect a power failure or loss of an IP connection within a computer network, and the capability to provide dial-up telephone notification of the occurrence of these conditions. Net bot 40 can provide agents to monitor and continuously detect if an internet connection is active and if the main power grid serving the network is on. If an internet connection, or main power, is lost, net bot 40 can dial out via telephone connection 42 to inform a system administrator of the loss of power or loss of the internet protocol connection. Dial-up telephone notification via telephone connection 42 can serve as a failsafe in the event that net bot 40 cannot communicate with the system administrator via the internet through an email. As with climate bot 30 of FIG. 3 and video climate bot 34 of FIG. 4, net bot 40 of FIG. 5 can be upgraded easily to provide agent functionality to monitor the various parameters of a computer network.

Figure 6:
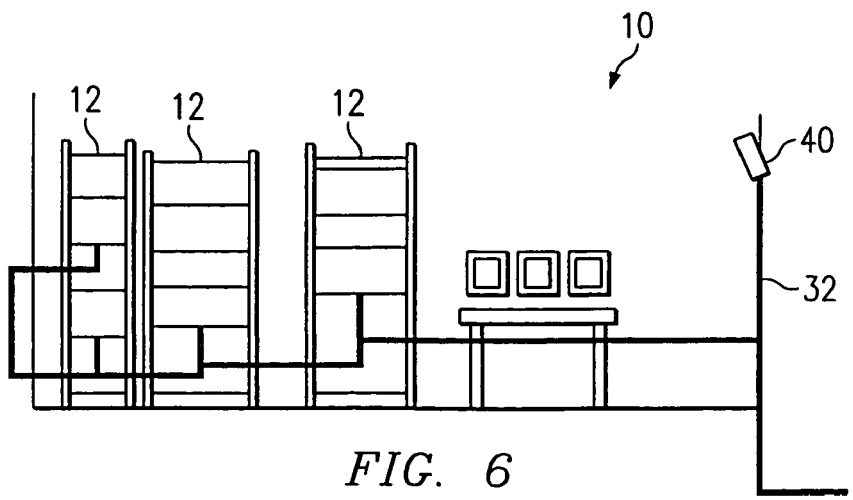
FIG. 6 illustrates another embodiment of the computer network and equipment monitoring method and system of the present invention.

FIG. 6 illustrates another embodiment of the computer network and equipment monitoring method and system of the present invention. Net bot 40 of FIG. 6 can have SNMP, DMI and NT access for internal server monitoring. Like enterprise-class network monitors, net bot 40 can periodically check for SNMP traps, Windows NT traps, and BIOS alerts, and can notify the system administrator of their occurrence. Common functions of net bot 40 can include checking the on/off status of both CPU fans and other system fans, CPU temperature checking, and checking of the conditions of various disk drives. Net bot 40 can support various protocols, including SNMP (simple network message protocol). Net bot 40 can launch software agents that can determine the operating condition of system routers, bridges, uninterruptable power supplies, etc. If the agents find a stuck disk, for example, on a server, they will log it as a fault. When a fault is detected, agents of net bot 40 can return that condition to net bot 40 in java language, and net bot 40 can generate an email message reporting the malfunction. Net bot 40 can be configured to maintain an email list of all personnel the system administrator wants net bot 40 to notify. Net bot 40 can also be configured to, after waiting a certain amount of time following email notification, page the system administrator or other personnel.

Beyond receiving notification via email of a fault, a system administrator, or other user, can obtain real-time reports of environmental conditions and equipment conditions in a server room via an internet connection to net bot 40. Additionally, if, like video climate bot 34, the embodiment of the present invention being used by a system administrator provides video, a current video image of the monitored server room 10 can also be viewed via the internet. A system administrator can configure net bot 40, climate bot 30, or video climate bot 34 to provide only the information the system administrator is interested in receiving. In this way, the interface of the embodiments of this invention can be kept as simple or as complex as a system administrator requires. Any of the embodiments of the present invention can be upgraded via software that can be downloaded from the internet.

Another embodiment of the computer network and equipment monitoring method and system of the present invention can be mounted within a component rack, such as rack 12 of FIG. 1. This "rack bot" can provide the same functionality as climate bot 30, video climate both 34, or net bot 40, but in a smaller package that can be mounted internal to a rack 12. In this way, individual components within a rack 12 can be monitored and a web page provided for each component monitored by a rack bot. One use for a rack bot according to the teachings of this invention could be, for example, to monitor individual components of companies or individuals that lease out space within another company's rack for their own servers or other components. Using a rack bot, the individual or company renting space within someone else's rack could independently monitor their equipment. Rack bots can be mounted inside of a rack using, for example, Velcro or some other attachment method.

Each of the embodiments of the computer network and equipment monitoring method and system of the present invention described above can be stand-alone units configured and maintained by a system administrator. However, they can also be easily incorporated into an existing monitoring system to complement or augment that system. This is possible because the embodiments of the present invention can be object properties and can be accessed as such.

The embodiments of the present invention shown in FIGS. 5 and 6 illustrate the capability of this invention to launch agents or bots from a satellite platform. Typically, agents for monitoring a computer system's performance are resident on the system. These agents typically can be made to perform their function and then can be placed in a "sleep" mode. Prior art platforms thus typically invoke agents and receive information from agents on the platform itself. The embodiments of the present invention, in contrast, can invoke agents resident on a system, such as a computer network, from a remote satellite position. They can invoke the system's own agents remotely, receive information from the agents, and pass the information to a user. Furthermore, net bot 40 of the present invention and other embodiments of the present invention, can be upgraded with support for new agents to query new equipment that is added to the network. In this way, net bot 40 and the other embodiments of the present invention can be kept current and can be used to monitor equipment that is newly added to an existing computer network.

FIG. 7 is a conceptual block diagram of an embodiment of the computer network and equipment monitoring system of the present invention. Circuit 50 contains video imager 52 for receiving and capturing images of the monitored server room or other space, temperature sensor 60 for sensing temperature within the space, humidity sensor 62 for monitoring relative humidity, and air flow sensor 54 for monitoring the status of cooling air flow within the monitored space. This sensor circuitry also can process environmental information received to help eliminate noise and make the information more useful to microprocessor 72. Analog amplifier 58, image logic module 56, and image buffer 64 combine to receive, translate, process and forward the images captured by video imager 52 to the system web site. Analog-to-digital converter 66 converts the analog signals received from the various sensors to their digital equivalent for microprocessor 72.

Microprocessor 72 is the central circuit element with which all other circuit components interface. Microprocessor 72 can be a Dallas Semiconductor 80C390 microcontroller. Memory modules 68 and 70 are used to store both persistent and temporary information required by the system. Line interface 76 and internet interface 74 provide the interface between microprocessor 72, telephone module 80 and ethernet RJ45 connector 82. Analog-to-digital converter 66 converts the analog signals received from the various sensors to their digital equivalent for microprocessor 72. Five-volt power supply 78 can receive and transform electrical power from a wall-mounted receptacle to power circuit 50. Humidity sensor 52 and air flow sensor 54 are described in more detail below.

FIG. 8 is a simplified box diagram of the architecture of the embodiment of the present invention shown in FIG. 6. Sensors 54, 60, 62, 84, and 86 interface to the analog-to-digital converter 66 which converts the signals for use by the microprocessor.

The solid state imager 52 is a VLSI Vision 5300 CMOS imager and incorporates the auto-imaging algorithms 56. The algorithms include gamma correction and anti-blooming and are included because any solid-state cameras do not incorporate these algorithms in hardware, so if there is a need to implement these in software if another camera is to be chosen. Buffer 64 and Parallel Interface 65 provide the necessary logic to interface directly to the CPU's data bus.

MHDY Clock 92 is a battery powered real-time clock that maintains a clock for the system that provides time in hours and minutes as well as months, days and years. The clock used is a Dallas Semiconductor DS1315.

The 5 VDC power supply 78 is generated from a typical wall supply that converts 120V to a regulated 5V. The power fail detector 88 can be integrated as part of the power supply or detected from an external source such as an uninterruptable power supply. This sensor detects the failure of the supply from the utility company and provides a means of switching the device to battery power 90 as well as notifying the CPU of the power failure.

The SNMP client 106 implements the common functions necessary to query the status of external devices such as routers, bridges, and uninterruptable power supplies. The necessary functions for SNMP clients is defined by the IETF.

The email generator 104 is a standard SMTP client that generates MIME compliant email. Like SNMP, the standards for this type of program is documented in a number of documents issued by the IETF.

The alarm rules 102 are the set of conditions specified by the user of the device. When any of these conditions is true, the ClimateBot engine 100 will generate an email via the email generator 104. This email will be sent to a specified set of recipients.

The ClimateBot Engine 100 provides the integration of all the other parts of the device. It generates the HTML pages using information provided by sensors 54, 60, 62, 84, & 86, the camera, and the SNMP client 106. It also monitors the alarm rules 102 for error conditions.

The ClimateBot engine communicates via one of two means. It can communicate using a standard 10BaseT ethernet 94 or it can communicate using a telephone lien interface 112. The choice of communications channel does not change how the ClimateBot engine communicates with the outside world. The device still routes its messages through a TCP/IP stack 96 which in turn routes the message either to the ethernet driver 94 or through the PPP driver 108, serial interface 100 and on to the telephone module 112. The PPP (point-to-point) driver 108 is a standard means of using a communicating over a serial link reliably. It is well documented in IETF standards.

The family of NetBotz, ClimateBots may be powered by using power existing on the ethernet cable either in the form of data or power on the cable. The data signals will be received and averaged to supply a continual source of voltage and current to the Netbot or ClimateBot device. Thus eliminating the need for external power supplies. The device shall receive the data and use an appropriate amount of power from ethernet data signal or power signal such as to not disturb the signaling capacity of the line only to use the excess capacity of the signal lines.

FIG. 9 is a circuit schematic of humidity sensor 52 of FIG. 7. Humidity sensor 52 is used to sense the relative humidity of the air within a space. Humidity sensor 52 includes relative humidity sensor chip 202, which can consist of a ceramic plate that shrinks or expands with changes in relative humidity. The shrinking and expanding generates an electrical signal proportional to relative humidity. Humidity sensor 52 operates under well-understood principles of electrical circuitry to provide an indication of relative humidity. A person of average skill in the art can understand and reproduce the functionality of humidity sensor 52.

Humidity sensor 52 is comprised of five parts: an oscillator, a lowpass filter, humidity sensor chip 52, and two peak detectors. The oscillator subcircuit can consist of resistors r3, r5, r7, and r15, capacitor c6, and op-amp U1B. This subcircuit produces a square-wave with a nominal frequency of 1 khz. The square-wave signal is lowpass filtered using a two-stage lowpass filter. The first stage consists of resistor r16 and capacitor c4. This is a passive filter, so the output is slightly attenuated. The second stage of the filter has some gain to make up for the attenuation of the first stage. The second stage of the lowpass filter consists of resistors r10, r17, capacitor c7, and op-amp U1A. This lowpass filter provides a waveform shaping function. The output of the lowpass filter approximates a sinusoidal waveform.

The output of the lowpass filter passes directly to humidity sensor chip 202 as well as to a first peak detector. Humidity sensor chip 202 can be a Figaro Engineering NH-2 humidity sensor. Humidity sensor chip 202 attenuates the amplitude of the input sinusoid waveform based on the relative humidity. The output of humidity sensor chip 202 passes to the second peak detector.

The first peak detector, consisting of diode D2, capacitor C3, and resistor R19, provides an estimate of the amplitude of the humidity sensor input. Likewise, the second peak detector, consisting of diode D1, capacitor C1, and resistor R1, estimates the amplitude of the humidity sensor output. The relative humidity is determined by computing the ratio of the output amplitude to the input amplitude.

FIG. 10 is a circuit diagram illustrating the air flow sensor 54 of FIG. 7. Air flow sensor 54 essentially acts as an air-on/air-off indicator. Air flow sensor 54 is comprised of a "hot wire" anemometer circuit and a differential amplifier.

The anemometer circuit can consist of resistors R6 and R9, potentiometer R8, and two thermistors 302 and 304. Thermistors 302 and 304 vary resistance with temperature. The anemometer components can be placed in a classic 'wheatstone bridge' configuration. Each leg of the bridge contains one of the resistors and one of the thermistors. One of the legs also includes potentiometer 306.

Thermistor 302 is mounted near the opening of, for example, net bot 40 and is exposed to the environment being monitored. Thermistor 304 should be mounted such that it is shielded from the air flow, such as within the outer casing of net bot 40.

When no air flow is present in the space being monitored, both legs of the bridge will have equal resistance except for a small difference due to component tolerances. Potentiometer 306 can be used to compensate for this difference. When air flow is present, thermistor 302 will change its resistance because the air flow changes the temperature at thermistor 302. Thermistor 304 will not change because no air flow reaches it.

The voltage across each of thermistors 302 and 304 passes to the inputs of the differential amplifier. The differential amplifier amplifies and filters any difference between the thermistor 302 and 304 voltages. The filter operation limits the effect of any fast changes in temperature that would not be due to air flow. The amplified differential voltage provides a signal indicative of air flow.

Air flow sensor 54 can be used to inform a system administrator if the air conditioner blowers have failed in a given space. Typically, air registers in a server room blow air across the ceiling and down the room walls, so the location of net bot 40 on a wall is a good location to determine whether air flow is on or off. Air flow sensor 54 need not be calibrated to indicate flow in any given units, but can be if desired. Neither air flow sensor 54 nor humidity sensor 52 need be recalibrated and hence are essentially maintenance-free components.

Returning now to FIG. 7, temperature sensor 60 can be a standard off-the-shelf temperature detector and is typically accurate to within a degree. Smoke detector 84 can be a microphone with a notch filter. The notch filter of smoke detector 84 can be calibrated to detect only frequencies typically associated with smoke detector alarms in buildings. All other sound frequencies can be excluded, and smoke detector 84 will only generate an alarm condition signal if the frequencies associated with a smoke detector alarm are detected. Smoke detector 84's functionality is especially useful in applications where smoke detector alarms are self-contained, battery-operated units. Configuration of smoke detector 84 eliminates the need for running wiring between a smoke detector alarm and any embodiment of the computer network and equipment monitoring system of the present invention. Sensor 86 of FIG. 8 can be an external sensor, such as a magnetic switch connected to a door leading into a server room, and can provide a signal when the door is opened.

Figure 11:
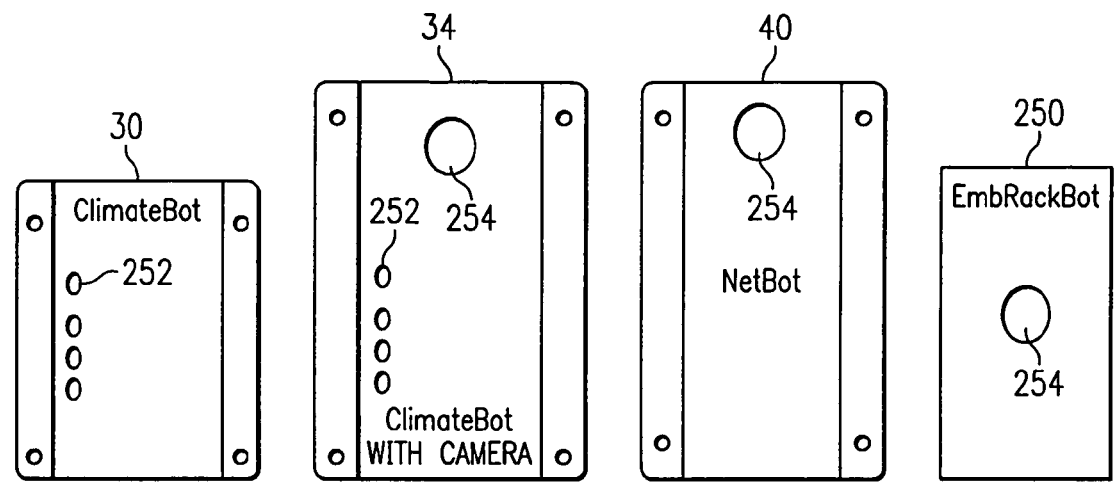
FIG. 11 shows the physical layout of various embodiments of the present invention.

FIG. 11 shows some of the embodiments of the present invention as described above. Climate bot 30 is shown with four LEDs 252. LEDs 252 can indicate, for example, that temperature and humidity are within limits, or can be used as a "heartbeat" indicating that the unit has power and is operational. A front view of climate bot 34 is also shown with four LEDs 252 and video imager 254. One variation of net bot 40 is shown without LEDs 252, but having video imager 254. Rack bot 250 is shown with video imager 254. Although only a few embodiments of this invention are shown in FIG. 11, various combinations that have not been described are possible. Features from one of the embodiments of the present invention can be combined with the features of another embodiment to form a new embodiment.

Figure 12A:
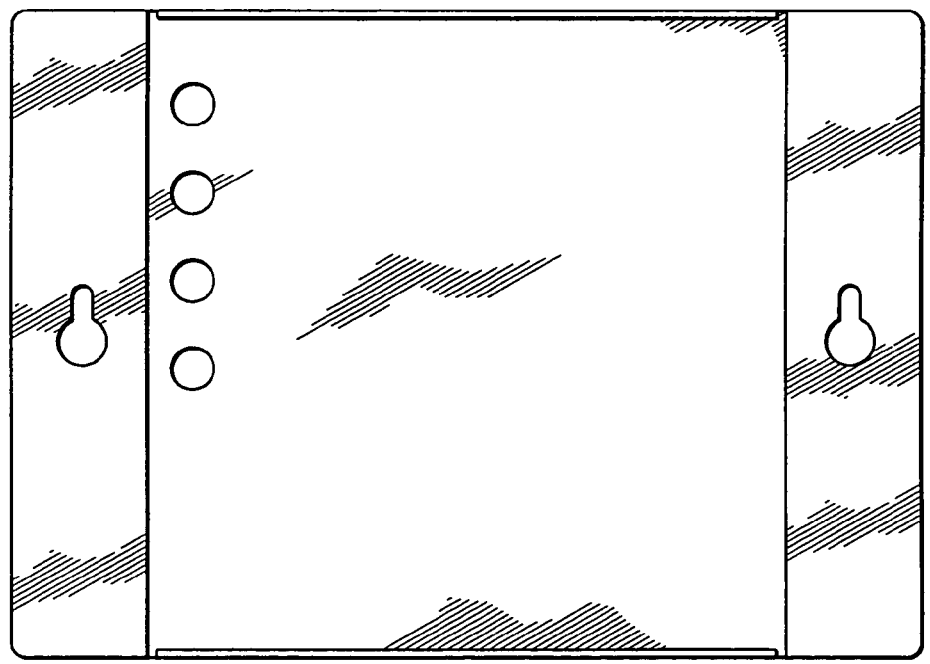
FIGS. 12A, 12B, 12C, and 12D show various views of the sheet metal housing of an embodiment of the present invention.
Figure 12B:
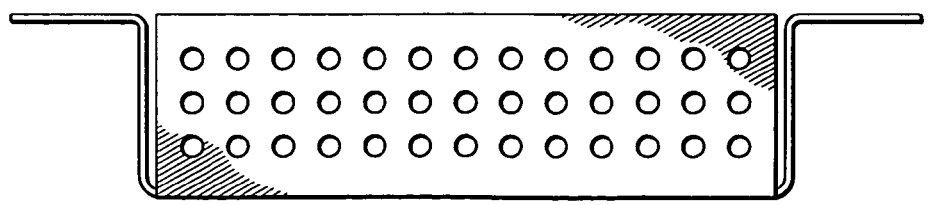
Figure 12C:
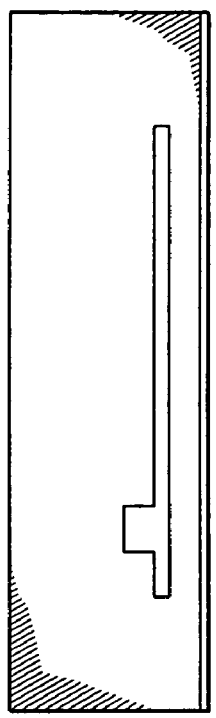
Figure 12D:
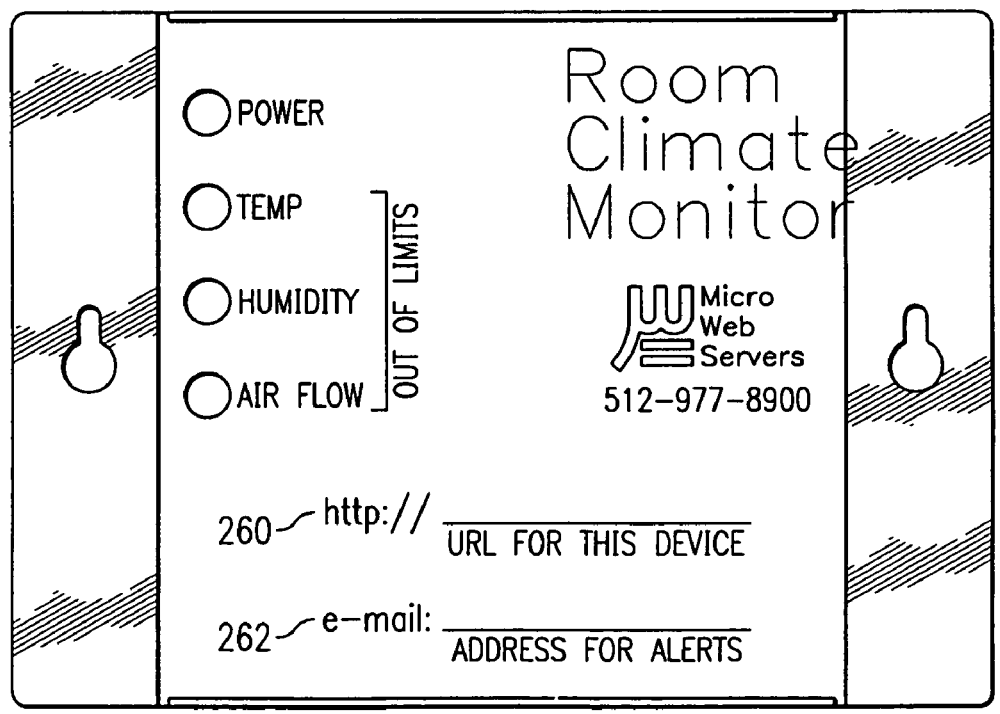

FIGS. 12A, 12B, 12C, 12D show various views of the sheet metal housing of, for example, climate bot 30. Although particular dimensions and locations of slots, perforations, notches and indentations are shown, these are illustrative only and various other dimensions and combinations of such slots, perforations, notches and indentations are possible. FIG. 12A is a front view of climate bot 30's housing, FIG. 12B a top view, and FIG. 12C a side view. FIG. 12D shows a full frontal view of the housing with the accompanying lettering that can be placed on the surface of the housing. FIG. 12D also shows the spaces on the housing that can be made available to record the URL address 260 for a given unit, as well as the email address 262 that can be programmed into the unit for email alerts.

FIGS. 13A, 13B and 13C show front, top, and side views, respectively, of the sheet metal housing of, for example, video climate bot 34 of FIG. 4. As in FIG. 12, the views in FIG. 13 are illustrative only, and the dimensions shown can be changed to fit different embodiments of the computer network and equipment monitoring system of the present invention. FIG. 13A shows video climate bot 34's sheet metal housing with opening 270 to accommodate video imager 254.

An embodiment of the computer network and equipment monitoring method and system of the present invention incorporating micro web-server technology and video imaging technology as described above could be used, for example, in an on-line auction type environment. This could allow, for instance, the placing of goods for auction on a site such as eBay by creating a link to the web site of a micro-web server according to the teachings of the present invention. Someone visiting the auction site and wishing to bid on the offered goods could click on the link and get a real-time image of the goods offered for sale. This can eliminate the problems of prior art methods that required someone offering goods for auction on line to take a digital picture, or digitally scan a regular picture, store the resulting image on their home page or local site, and hot link to the stored image.

This embodiment of the present invention can be as simple as the self-contained micro web server described above with a digital camera and an ethernet connection to the internet. Real-time video images could thus be sent to on-line users to provide an image of goods offered for sale or that are to be monitored. In this way, a very small computer of limited memory can be used as a net-cam URL generator to provide essentially real-time images via creation of a unique web site that can be accessed remotely. This method requires the use of an embedding process for response generation, whereby a user clicking onto the web site causes a still image to be captured by the camera of this embodiment of the present invention and forwarded to him or her.

Returning now to FIG. 7, microprocessor 72 of FIG. 7 can be a TINI (tiny internet interface), a virtual machine developed and sold by Dallas Semiconductor as described above. Dallas Semiconductor's TINI is a compact circuit board or chip set that incorporates the latest in low-cost embedded java technology. Using TINI, it is possible to develop java applications quickly and easily to provide an internet or intranet interface for the system of the present invention. Combined with a simple web server application, microprocessor 72 can become a very small Java web server. In this way, the machinery and the network can be melded into a single entity. The system of the present invention can thus talk to a computer network by use of a specialized java data language and the improved processing capabilities provided by microprocessor 72 while maintaining low cost.

The high level of integration incorporated into microprocessor 72 allows software developers to write efficient, I/O-intensive Java applications. In typical applications, microprocessor 72 can control and monitor attached equipment and transfer collected control and status information over a computer network as described above. Microprocessor 72's three-chip set consists of a microcontroller, flash memory containing the firmware, and an ethernet controller. The microcontroller integrates serial, parallel 1-wire, and controller area network (CAN) ports, with extra pins for controlling optional devices such as relays and indicator LEDs. Microprocessor 72 can address up to four megabytes of RAM and 512 kilobytes flash memory. An integrated real-time clock enables time stamping and time-dependent functionality. For security sensitive applications, a physically secured coprocessor with advanced cryptographic capabilities can be made available.

Microprocessor 72 of the present invention is optimized to accommodate the embedded java environment. The microcontroller supports 24-bit addressing and 8/32-bit CPU/ALU and high clock rates of approximately 60 MHz and other java enhancements. Microprocessor 72's I/O ports include Ethernet 10 base T interface, dual 1-wire net interface, a CAN interface, a dual serial port (one RS232 level and one +5V level), an I$^2$C port, and an expansion bus allowing nearly unlimited parallel ports and miscellaneous digital and analog I/Os. The software platform on which microprocessor 72 runs is embedded Java implemented in firmware that is programmed in the flash memory and can be upgraded as necessary.

Microprocessor 72 includes a java virtual machine (VM/API), a multi-tasking, real-time operating system (RTOS), and a TCP/IP networking stack. The java virtual machine on microprocessor 72 conforms to Sun's Embedded Java™ platform. Various Java packages can be embedded in microprocessor 72's flash memory. An additional advantage of using a java processor is that the system of the present invention can eventually be migrated to cheaper processors as they become available, without having to re-write the core software.

A further advantage of the computer network and equipment monitoring method and system of the present invention is that it can be powered directly through an Ethernet connector as an alternative to wall-mounted transformer. Typically, an Ethernet cable carries a large voltage in order to move data between network components. The voltage generated to move data along an Ethernet cable is generally much greater than is necessary, and the excess generally resolves itself as heat in the network inductors. The computer network and equipment monitoring method and system of the present invention can use the excess voltage and current flowing through an Ethernet cable to power itself. For example, the excess current generated by the excess voltage in the ethernet cable can be used to charge a rechargeable battery on a wall-mounted unit. Additionally, microprocessor 72 can be placed into a stand-by mode to conserve power.

The present invention is fully programmable in an HTML format using HTML forms. Programming can be performed locally or remotely through a web interface. The various monitored parameters can be configured through a web interface, as can the alarm setpoints. Unlike in current network management systems and methods, network management can be accomplished through a simple and easy-to-understand web interface.

The embodiments of the present invention can be configured to, locally or remotely, operate an external load through an internet or intranet interface in response to a preset condition or in response to a command from a system administrator. For example, auxiliary A/C units could be set to turn on when the room temperature reaches a pre-set limit. The present invention can include one or more binary (on-off) outputs connected to one or more relays that can control an external load or loads. The loads can be high voltage loads.

An RF (radio frequency) output, or other wireless output, can also be incorporated into any of the embodiments of the present invention to allow a wireless call to such an external load. Furthermore, it is possible to load a 64-bit encoded chip onto the circuit board of any of the embodiments of the present invention to provide encryption and password security. Privacy protection in the form of a private key and a public key can be provided. The present invention can also include additional outputs to provide audible alarms or for interfacing to other proprietary monitoring systems.

The embodiments of the present invention can provide a low-cost, reliable, self-contained web server using industrial-grade embedded processes and commercial-grade semiconductors. The present invention can be manufactured with no moving parts, increasing its reliability. The present invention can also, using a central data collection java program, automatically scan and store multiple sites for an IT manager to allow the IT manager to avoid looking through emails from past condition reports or trend analysis.

The present invention searches for equipment that is either on or off line and uses the static IP address, among other identifiers, to address and locate the device. The search can provide the IT manager with information, such as device availability, capacity, and inventory, as well as gathering information for the analysis and creation of trend lines. The trend lines may be used by the IT manager to perform maintenance or to schedule replacement of failing or suspect devices in an orderly and efficient manner.

It should be noted that the present invention is self-contained and does not need to be connected to or integrated with the users system or cpu. The present invention can be linked up with one or more of the users system via standalones, laptops or any other cpu to take advantage of any additional functionality that those systems might provide, although it is not necessary for the implementation and operation of the present invention.

The web interface of the computer network and equipment monitoring method and system of the present invention provides the ability to manage agents from any web browser, from across the room or across the globe. The self-contained web servers in each embodiment of the present invention can create their own web site. The embedded web server of this invention can thus be managed and configured from a standard web browser. End users therefore need not install new software on their systems or train their staff on how to use the system. A monitored space's condition can thus be quickly access via a web browser.

The various embodiments of the present invention can report static and dynamic system-critical events logged by a system's files and can provide an integrated user interface that can be launched from IT enterprise management (ITEM) applications. Various embodiments can provide alert redirection to stations and management consoles of other monitoring systems, such as HP Open View. The present invention can also provide management of on-equipment display devices such as local LCD panels. The present invention can also be DMI compliant and support SNMP traps. The various embodiments of the present invention can also support LM75/78/79 and other health devices, devices on ISA, SM Bus and 12C Bus and can provide DMI event generation on status changes.

The present invention can comprise a device having an embedded processor connected to a temperature sensor, humidity sensor and air flow sensor that can be programmed to report the values of these physical parameters via an HTML interface. The present invention can be configured to generate email messages and paging notification events when one or more parameters exceeds a user configurable threshold value. The system of the present invention can be configured via an HTML interface. Furthermore, the present invention can include an image capture device, such as a CMOS imager, or other digital camera. Thus configured, the present invention can further provide real-time images of a monitored space.

The present invention can store an image from the video imager in response to a binary (on/off) input when the binary input is active. The binary input can be provided by an external sensor such as a magnetic door switch. Furthermore, the present invention can be programmed to continuously investigate the internal condition of numerous network devices through SNMP, DMI, and SMBIOS interfaces. The present invention can determine the status of fans, CPUs and other relevant components and include status information, along with the environmental parameters of the monitored space, to create a unified HTML or email report. A user can configure the system of the present invention via an HTML interface.

Figure 14A:
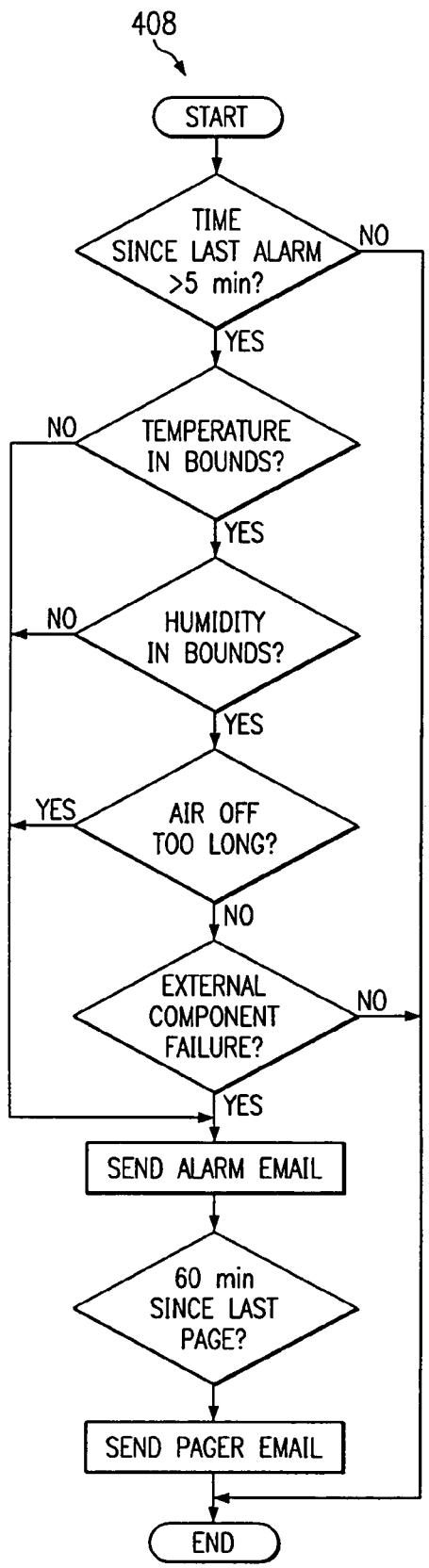
FIG. 14A represents a flow chart of the process alarm conditions of the present invention.
Figure 14:
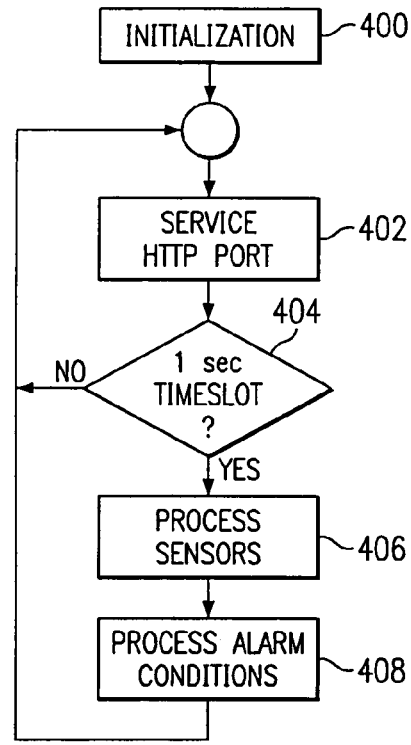
FIG. 14 is a top level flow chart diagramming the operation of an embodiment of the computer network and equipment monitoring method of the present invention.

FIGS. 14-19 are flow charts diagramming the operation of an embodiment of the method of the present invention. FIG. 14 is a top level flow chart diagramming the operation of an embodiment of the computer network and equipment monitoring method and system of the present invention. At step 400, system initialization occurs. The initialization process can be run at power-up. The one-time setup of the processor, peripherals, and software can be performed at initialization.

The top-level of the program of the method of the present invention can consist of an infinite loop. Each time through the loop, the program can check for network messages. The program also contains a clock. This clock can be checked each time through the loop. When the clock reaches a certain time interval, such as a one-second interval shown in step 404 of FIG. 14, the program can be configured to read the sensors, perform required calculations, and check for alarm conditions, as discussed below.

At step 402, the method of this invention continuously polls the Ethernet hardware to check for incoming network messages. When a network message arrives, the program can launch a new process and pass the received message to the new process. This new process can act on the message based on the message request.

At step 406, the method of this invention can read the temperature and all other channels of the analog-to-digital converter once per second, as determined at step 404. The program computes the temperature in degrees Fahrenheit, relative humidity in %, and air flow (on or off).

The method of the present invention can maintain a list of user-specified thresholds for each monitored quantity. At step 408, the method checks the sensor readings against the relevant thresholds to determine if an alarm condition exists. The method of this invention performs this check at a preset interval, as determined at step 404. The method of this invention can generate an email report when one of the sensors is outside its corresponding threshold value.

At step 408 the program checks for alarm conditions once per second, but can be set for other time periods, but only if the program hasn't recognized any alarm conditions in the past 5 minutes. This limiting condition prevents the recipients of the email reports that get generated from being inundated with one email per second. The program could just check for alarm conditions once every 5 minutes; but this would mean that up to 5 minutes could go by from the time an alarm condition occurs and the device actually recognizes the condition and tries to notify someone.

The program next checks the sensor readings against the stored threshold values. A temperature alarm occurs when the temperature reading is outside the range defined by the high and low temperature thresholds. Similarly, a humidity alarm occurs when the humidity readings is outside the range defined by the high and low humidity thresholds. An air flow alarm occurs when no air flow is detected for the specified period of time.

When an alarm condition occurs, the program then generates an email message consistent with the standards for email messages set forth by the IETF. An alarm message simply states the sensor causing the alarm and the current value of that sensor. The email message is then sent to the list of recipients that was specified in the administration form and stored in the configuration.

The program can also send the same email message to a digital pager or email-enabled cell phone. However, because the service providers of these communication devices often charge for each email message sent to the device, the program will only send a message to the designated pager address once per hour.

The device may also include software to check external devices such as routers, servers, or UPS's via the network. Such programs are referred to as 'crawlers' or 'bots'. If any of these bots have placed on the device; the program will periodically execute them. These programs will return the status of the external device and indicate if any component on the device has failed. If any component has failed, then an alarm email will be generated.

Figure 15:
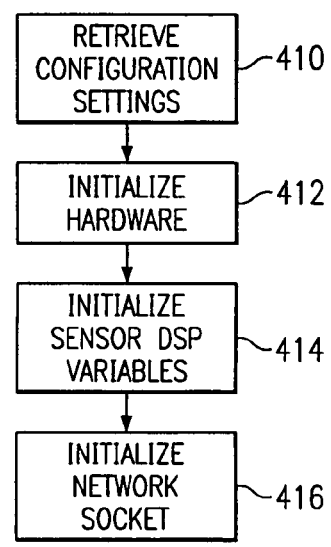
FIG. 15 is a flow chart diagramming the initialization process of the monitoring method of this invention shown in FIG. 14.

FIG. 15 is a flow chart diagramming the initialization process of the monitoring method of this invention shown in FIG. 14. At step 410, a file containing user-defined settings for the various parameters of the system of this invention is accessed to determine the appropriate system variables. Those variables can be read and set at system power-on.

At step 412, hardware peripherals are configured to operate as desired. This typically must be performed at power-up. In particular, the Ethernet controller chip is configured to interface with the microprocessor in 8 bit mode. The analog-to-digital converter is set to provide 16-bit results with inputs in the range 0-5V. Other system variables can also be configured.

The techniques used by the method of this invention to compute humidity and air flow require some digital signal processing calculations. These calculations require a number of buffers to store intermediate values. At step 414, the contents of these buffers are initialized to 0.

At step 416, the method of this invention creates a TCP socket on port 80. Software applications that interact with the worldwide web perform many of their transactions on TCP port 80. Because the system of this invention can behave as a server 'on the web,' a TCP socket on port 80 is necessary in some instances. The system of this invention will not be visible 'on the web' until this socket is created.

The method of this invention can retrieve configuration settings as shown in FIG. 16. At step 418, a configuration file is read to determine the values of certain system variables. In order to respond to network messages, the system of this invention needs to know a number of settings. At step 420, network variables are initialized as determined from the configuration file. For example, the system must know its IP address in order to receive messages. Similarly, the subnet mask and the gateway IP address of other devices are needed to properly route messages to them. To send email, the system of this invention must know the IP address of an SMTP (Simple Mail Transfer Protocol) server. An SMTP server is roughly the electronic equivalent of the US Postal Service's blue mailboxes. The other network related settings that the method and system of this invention can store are the network name of the system, the internet domain name in which the system is implemented, and the list of email addresses that will receive the alarm reports generated by the system.

Some of the information stored in the configuration file is only used as part of an HTML response to a request on TCP port 80. This information includes the system name, the physical location of the system, and the name of the person in charge of the system. A typical HTML response to a status request is shown in FIG. 17.

Stored location 426 is shown in FIG. 17. The remaining values are used in response to a request for administration data. These values include temperature 428, humidity 430, and air flow 432. Temperature can be provided in Celsius or Fahrenheit units. FIG. 17 also includes email notification addresses 434 to which the report is sent.

Returning to FIG. 16, at step 424 the method of this invention initializes the alarm thresholds for the monitored parameters. These user-specified thresholds can be maintained in the configuration file and can include high temperature, low temperature, high humidity, low humidity, and 'maximum air off time'. The 'maximum air off time' is the amount of time with no air flow the system will wait before the program declares a no air flow alarm.

FIG. 18 is a flow chart diagramming the response of the system and method of this invention to an HTTP request. At step 440, the system determines if a request has been sent to TCP port 80. HTTP requests are typically in the form of "Method Filename Version". The 'Method' tells the system what operation to perform on the 'Filename'. The 'Version' tells the program what version of HTTP the requesting browser is using. This is all part of the HTTP standard that was drafted by the internet Engineering Task Force (IETF), the organization that controls internet standards.

At step 442, the method of this invention first looks at the 'filename' part of the request. The method will respond to requests for filenames "status" or "admin." If no filename is given, the method assumes the request is for the status. If a filename is given that is not a "status" request, then at step 444 the method of this invention determines if the request is an "admin" request.

If the request is a status file request, then at step 446 an HTML file is generated similar to that shown in FIG. 17. At step 460, the file is sent as output to the user requesting the file.

At step 448, if the request is for the administration file, the method checks to see if the request came from an authorized user. If the request did not come from an authorized user, an HTML response indicating an error will be generated at step 452. Similarly, an error request will be generated if at step 444 the request is not for the admin file.

If the user is an authorized user, then at step 450 the method of this invention determines if the request 'method' is either 'get' or 'post.' If the request 'method' is 'get,' then at step 454 an HTML form is generated that includes entry fields for all the configuration settings previously mentioned, as well as a "submit" button. The user requesting the administration information can change whatever information he or she chooses and submit the information to the system. When the submit button is pressed, the browser (Netscape Navigator or internet Explorer, for example) can generate an HTTP 'post' request for the administration page and include with the request the values placed in each of the entry fields.

When a post request is received for the administration page, then at step 456 information that represents the values placed in the entry fields of the form is parsed off. The values placed in the entry fields can be matched to the corresponding variables in the program. These variables are updated and the new configuration is stored.

Once the configuration is stored and the program variables successfully updated, at step 458 an HTML response can be generated that displays the new settings. This response can then be sent to the user at step 460.

The system of the present invention can use a Dallas Semiconductor DS1820 temperature sensor. The temperature sensor provides microprocessor 72 with a number representing the temperature in 0.5 C units. This number can be converted to both units of ° C. and ° F. There are a number of other commercially available temperature sensors that can be used in the system of this invention.

The system of the present invention can include an analog-to-digital converter (ADC) 66, which can be a four-channel ADC. The circuitry for the humidity and air flow sensors is connected to the ADC 66. ADC 66 does not generate a conversion until it is directed to do so. The system of this invention can, for example, instruct ADC 66 to make a conversion once every second.

The circuitry comprising humidity sensor 62 can provide two signals to compute relative humidity. Two adjustments to these signals must be made before the humidity value can be computed. First, the signals are offset by 2.5 volts, so this value must be subtracted from both of the converted values. Second, the voltage drop lost across the diodes in the circuit must be added back to the converted values so that an accurate humidity value can be computed. The ratio of these two adjusted signals defines an index into a lookup table. The system determines the relative humidity by retrieving the value in the table at this index. This value represents the relative humidity as a percent.

The monitoring system of this invention can derive the presence or absence of air flow from a signal provided by the anemometer circuit. This derivation can be implemented by a series of signal processing steps. A block diagram of the signal processing steps is shown in FIG. 19. First, the signal is highpass filtered at step 470 to remove slow variations in the signal that might be caused by time degradation of circuit elements or temperature changes that occur on the order of hours. The absolute value of the highpass filtered signal is taken at step 472 to remove negative signal swings. Circuit noise can cause a persistent signal to be present in the absolute value of the highpass filtered signal. This persistent signal can be negated by lowpass filtering at step 474, the absolute value of the highpass filtered signal and then subtracting the lowpass filtered signal from the absolute value signal at step 476. This resulting signal may falsely indicate air flow due to abrupt circuit disturbances or even humans walking past the device. To reduce the possibility of these false indications, the signal can be integrated at step 478. When the integrated signal exceeds a fixed threshold at step 486, the system can provide an indication that air flow is present.

The monitoring method and system of this invention can check for alarm conditions on a preset time interval. These checks can be set to occur only if an alarm condition has not occurred within a second preset time interval. This limiting condition can be used to prevent the recipients of the email reports that get generated by the system of this invention from being inundated with emails.

To determine if an alarm condition exists, the present invention can check the sensor readings against the stored threshold values. A temperature alarm can occur when the temperature reading is outside the range defined by the high and low temperature thresholds. Similarly, a humidity alarm can occur when the humidity readings is outside the range defined by the high and low humidity thresholds. An air flow alarm occurs when no air flow is detected for the specified period of time.

When an alarm condition occurs, the present invention can generate an email message consistent with the standards for email messages set forth by the IETF. An alarm message can simply state the sensor causing the alarm and the current value for that sensor. The email message can be sent to the list of recipients specified in the administration form and stored in the configuration.

The monitoring system of this invention can also send the same email message to a digital pager or email-enabled cell phone. However, because the service providers of these communication devices often charge for each email message sent to the device, the monitoring system of this invention can be configured to send a message to the designated pager address once per hour to limit expenses.

Figure 20:
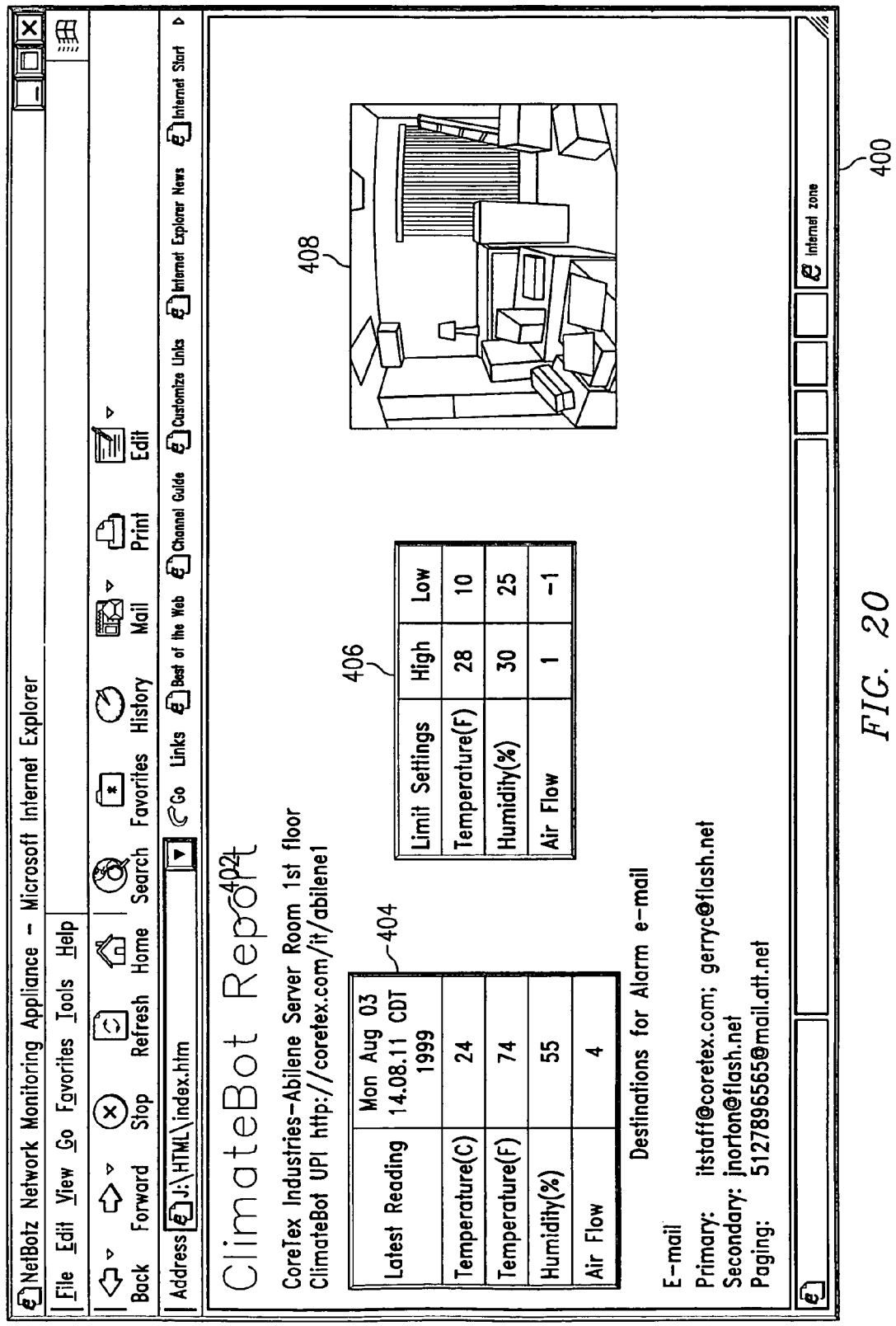
FIG. 20 is a screen shot of a typical web page generated using the monitoring system and method of the present invention.

FIG. 20 is a screen shot of a typical web page generated using the monitoring system and method of the present invention. Web page 400 from a typical web browser, such as Internet Explorer or Netscape Navigator, includes climate bot report 402, which can comprise table 404 listing the various measured parameters and their values, and table 406 listing the current alarm settings for those variables. Image 408 can be included using some embodiments of the present invention that incorporate a video image to display a real-time image of the space being monitored. Additionally, destinations for alarm emails can be listed on web page 400. A system administrator can also designate additional information to be displayed on web page 400 for any of the embodiments of the present invention.

FIGS. 21A and 21B show a typical alarm email and scheduled report email that might be sent out by the computer network and equipment monitoring method and system of the present invention. The emails can include the date, location, the identity of the micro-web server sending the email, whether any of the parameters being monitored are in or out of limits, and the current limit settings. Additional information can be specified by a user for inclusion in the email reports.

FIG. 22 is a schematic diagram of the flow of the device opens a TCP connection to the external device. The specific port may be specified by the manufacturer of the device or the specific protocol (SNMP, DMI, etc. . . . ) being used to communicate.

Query the device. This may be a standard SNMP query as defined by IETF standard for SNMP or it may be DMI as defined by the DMTF (Distributed Management Task Force) or it may be proprietary to the device.

The device will respond to the query. If the query was SNMP, the response will be an SNMP response and must be translated for our use. Similarly, if the query was a DMI query, the response will be as specified by the DMI standard and need to be translated for our use.

If the response indicates that any element of the external device has failed or in danger of failing, the program will set the corresponding alarm condition for that device.

Listed below in Table 1 are some typical specifications for an embodiment of the computer network and equipment monitoring system of the present invention. These ranges and specifications are illustrative only and can include different values and/or different parameters.

TABLE 1

| Specifications: | |
|---|---|
| Temperature: | |
| Range: | −55° C. to +125° C. (−67° F. to 257° F.) |
| Sensor: | solid state element. |
| Accuracy: | +/−0.5° degree Celsius |
| Relative Humidity: | |
| Sensor: | porous ceramic, solid state. |
| Range: | 30% to 90% |
| Accuracy: | 10% |
| Response Time: | 120 seconds |
| Air Speed: | |
| Range: | 0 to 10 cubic feet/minute, non-linear. |
| Accuracy: | 30% |
| Sensor: | hot-wire anemometer (thermistor bridge). |
| Housing: | powder coated, 16 gauge aluminum. |
| Color: | PMS 462 Light Blue, white lettering |

TABLE 1-continued

Specifications:

| Connectors: | |
|---|---|
| Ethernet: | RJ-45 to Cat 5 network wiring |
| Series: | RJ-11 to serial device (for installation setup), |
| Power: | 6 mm barrel jack for 5 vdc power. |
| Data Speed: | 10 mHz, Ethernet |
| Protocol: | TCP/IP |
| Web page Generation: | Netscape 4.0 and IE 4.0 compatible |
| E-mail format: | MIME, limited to 200 characters |
| Mounting: | By 6-38 wood screws (supplied) or double-sided tape corner mount (supplied). |
| Indicator Lights: | Power On, Temp out of limit, Humidity out-of-limit, Air Flow out-of-limit. |
| Web Page Fields Accepted by Form: | |
| Field 1: | "Room or company name" |
| Field 2: | "Contact" |
| Field 3: | "URL address" |
| Field 4: | "IP address" |
| Field 5: | "Primary e-mail address" |
| Field 6: | "Secondary e-mail address" |
| Field 7: | "Temperature High Limit Setting:" |
| Field 8: | "Temperature Low Setting:" |
| Field 9: | "Humidity High setting:" |
| Field 10: | "Air Flow High setting:" |
| Field 11: | "Air Flow Low Setting:" |
| Field 12: | "Time between routing e-mail reports:" |
| Web Page Fields Generated at access: | |
| Field 1: | Temperature (C.) |
| Field 2: | Temperature (f): |
| Field 3: | Humidity: |
| Field 4: | Air Flow |
| Field 5: | Current High Temp Limit |
| Field 6: | "Room or company name" |

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A system for monitoring a space external to the system, the system comprising:
   a microprocessor;
   a memory coupled to the microprocessor, the memory including instructions for processing a sensor signal derived from at least one environmental parameter of the space external to the system and the memory including a web server application and an alarm processing program configured to:
   determine that an alarm condition has not occurred within a first preset time interval;
   compare, responsive to determining that the alarm condition has not occurred within the first preset time interval, the sensor signal to a threshold on a second preset time interval; and
   generate the alarm condition where the sensor signal exceeds the threshold;
   a sensor configured to detect the at least one environmental parameter of the space external to the system and configured to generate the sensor signal derived from the at least one detected environmental parameter of the space, the sensor selected from a group consisting of a temperature sensor, a relative humidity sensor, and an air flow sensor; and at least one port for communicating with a network, the at least one port responsive to the microprocessor, the web server application configured to provide a webpage associated with the sensor signal via the at least one port.

2. The system claim 1, wherein the network comprises a global computer network.

3. The system of claim 1, wherein the network comprises an intranet.

4. The system of claim 1, wherein the network comprises a wireless network.

5. The system of claim 1, further comprising one or more connectors to interface with external devices.

6. The system of claim 1, the system further comprising a power source.

7. The system of claim 6, wherein the power source is the excess voltage provided by an Ethernet cable coupled to an Ethernet connector.

8. The system of claim 1, wherein the network is accessed via a telephone line.

9. The system of claim 1, wherein the network is accessed via an Ethernet interface, and wherein the Ethernet interface has compliant TCP/IP stacks.

10. The system of claim 1, further comprising a radio frequency interface operable to communicate wirelessly within the network.

11. The system of claim 1, further comprising a radio frequency interface operable to communicate with a device external to the network.

12. The system of claim 1, wherein the microprocessor is an embedded Java microprocessor.

13. The system of claim 1, wherein the microprocessor is a tiny internet interface microprocessor.

14. The system of claim 1, wherein the microprocessor operates with an embedded Java software platform.

15. The system of claim 1, wherein the sensor comprises an air flow sensor comprising a hot-wire anemometer circuit.

16. The system of claim 15, wherein air flow is calculated.

17. The system of claim 1, further comprising a microphone.

18. The system of claim 17, wherein the system generates a signal upon detecting an audible alarm.

19. The system of claim 1, wherein the instructions for processing can be updated via the web server application.

20. The system of claim 1, wherein programming instructions are provided to the web server application via HTTP.

21. The system of claim 20, wherein the programming instructions comprise parameter threshold values.

22. The system of claim 1, wherein the instructions for processing operably generate an alarm signal in the event that the sensor signal exceeds a parameter threshold value.

23. The system of claim 1, further comprising instructions for generating and forwarding an email status report to at least one user.

24. The system of claim 23, wherein the status report indicates that the at least one environmental parameter has exceeded a corresponding threshold value.

25. The system of claim 1, further comprising instructions for generating and forwarding an email alarm report to one or more users when the at least one environmental parameter exceeds a corresponding threshold value.

26. The system of claim 1, further comprising instructions for generating and forwarding a status report via electronic paging.

27. The system of claim 1, further comprising instructions for dialing via a telephone connection to inform a system administrator of a loss of power or loss of internet protocol connection.

28. The system of claim 1, wherein the web server application provides an HTML interface.

29. The system of claim 28, wherein the HTML interface comprises an image display area, a monitored parameter display area, an alarm threshold display area, and a system user information display area.

30. The system of claim 29, wherein the system user information display area can be configured by a user to display customized information.

31. The system of claim 1, further comprising:
a power source; and a rechargeable backup power source to provide power upon loss of the power source.

32. The system of claim 31, further comprising a sensor configured to detect the failure of a power supply and notify the microprocessor of the power failure.

33. The system of claim 1, further comprising a video imager to provide a digital image of the space.

34. The system of claim 33, wherein the video imager is a CMOS imager.

35. The system of claim 34, further comprising a binary input to activate the video imager to capture an image of the space.

36. The system of claim 35, further comprising an external sensor, wherein the external sensor provides the binary input upon the occurrence of a preset condition.

37. The system of claim 36, wherein the external sensor is a magnetic switch for sensing the opening of a door to the space, and wherein the preset condition is the opening of the door.

38. The system of claim 37, further comprising a record data file to track personnel access into a room.

39. The system of claim 1, further comprising instructions for software agents operable to investigate an internal condition of a network component, the network component accessible via the at least one port.

40. The system of claim 39, wherein the software agents investigate the internal condition of compatible network components through communication in accordance with an interface, the interface being an SNMP, DMI, or SMBIOS interface.

41. The system of claim 1, further comprising one or more binary outputs connected to one or more relays to control one or more external loads, and instructions for controlling the one or more binary outputs.

42. The system of claim 41, wherein the external load is an air conditioning unit.

43. The system of claim 1, wherein the space external to the system is located within a server room.

44. The system of claim 1, wherein the system is mountable on a wall in a position to monitor the contents of a server room.

45. The system of claim 1, wherein the system is configured to be mounted in an equipment rack.

46. The system of claim 1, further comprising a unique universal resource locator and static internet protocol address.

47. The system of claim 1, further comprising an internet site.

48. The system of claim 1, further comprising an email list of personnel to notify.

49. The system of claim 1, wherein a third-party may access the webpage to monitor equipment in a leased space.

50. The system of claim 1, wherein the relative humidity sensor comprises a ceramic plate that shrinks or expands with changes in relative humidity.

51. The system of claim 1, wherein the webpage is accessible by clicking on a link at an online auction site.

52. The system of claim 1, wherein the system is self-contained and is remote from an end user computer.

53. The system of claim 1, further comprising an event log.

54. The system of claim 1, further comprising a list of user-specified thresholds for each monitored environmental parameter.

55. An apparatus comprising:
a sensor configured to measure ambient conditions with respect to monitored equipment, the sensor physically uncoupled and spaced apart from the monitored equipment and the sensor configured to measure the ambient conditions without use of a bidirectional communication link between the sensor and the monitored equipment, the sensor configured to generate a sensor signal associated with the measured ambient conditions, the sensor selected from a group consisting of a temperature sensor, a relative humidity sensor, and an air flow sensor; at least one microprocessor responsive to the sensor signal; video camera circuitry coupled to the at least one microprocessor, the video camera circuitry configured to acquire an image of the monitored equipment; memory coupled to the at least one microprocessor, the memory including instructions for processing the sensor signal, instructions for processing the image of the monitored equipment, and a web server application; and an alarm processing program configured to: determine that an alarm condition has not occurred within a first preset time interval; compare, responsive to determining that the alarm condition has not occurred within the first preset time interval, the sensor signal to a threshold on a second preset time interval; and generate the alarm condition where the sensor signal exceeds the threshold; and at least one network port responsive to the at least one microprocessor and configured for communicating the image of the monitored equipment and the measured ambient conditions in a web page provided by the web server application over a distributed computer network to a remote location for display.

56. The apparatus claim 55, wherein the distributed computer network comprises a global computer network.

57. The apparatus of claim 55, wherein the distributed computer network comprises an intranet.

58. The apparatus of claim 55, wherein the distributed computer network comprises a wireless network.

59. The apparatus of claim 55, further comprising one or more connectors to interface with external devices.

60. The apparatus of claim 55, wherein the distributed computer network is accessed via an Ethernet interface, and wherein the Ethernet interface has compliant TCP/IP stacks.

61. The apparatus of claim 55, further comprising a radio frequency interface operable to communicate wirelessly within the distributed computer network.

62. The apparatus of claim 55, further comprising a radio frequency interface operable to communicate with a device external to the distributed computer network.

63. The apparatus of claim 55, wherein the sensor comprises an air flow sensor comprising a hot-wire anemometer circuit.

64. The apparatus of claim 55, further comprising a microphone.

65. The apparatus of claim 64, further comprising an audible alarm detector that generates a signal upon detecting an audible alarm.

66. The apparatus of claim 55, wherein the instructions for processing can be updated via the web server application.

67. The apparatus of claim 66, wherein the instructions for processing comprise parameter threshold values.

68. The apparatus of claim 55, wherein the instructions for processing operably generate an alarm signal in the event that the sensor signal exceeds a parameter threshold value.

69. The apparatus of claim 55, further comprising instructions for generating and forwarding an email status report to at least one user at the remote location.

70. The apparatus of claim 69, wherein the status report indicates that the sensor signal has exceeded a corresponding threshold value.

71. The apparatus of claim 55, further comprising instructions for generating and forwarding an email alarm report to one or more users when the sensor signal exceeds a corresponding threshold value.

72. The apparatus of claim 55, further comprising instructions for generating and forwarding a status report via electronic paging.

73. The apparatus of claim 72, wherein the webpage comprises an image display area, a monitored parameter display area, an alarm threshold display area, and a apparatus user information display area.

74. The apparatus of claim 73, wherein the apparatus user information display area can be configured by a user to display customized information.

75. The apparatus of claim 55, further comprising:
a power source; and a rechargeable backup battery to provide power upon loss of the power source.

76. The apparatus of claim 75, further comprising a binary input to activate the video camera circuitry to capture an image of the space.

77. The apparatus of claim 76, further comprising an external sensor, wherein the external sensor provides the binary input upon the occurrence of a preset condition.

78. The apparatus of claim 77, wherein the external sensor is a magnetic switch for sensing the opening of a door to the space, and wherein the preset condition is the opening of the door.

79. The apparatus of claim 55, further comprising instructions for software agents operable to investigate an internal condition of a network component, the network component accessible via the at least one port.

80. The apparatus of claim 79, wherein the software agents investigate the internal condition of compatible network components through communication in accordance with an interface, the interface being an SNMP, DMI, or SMBIOS interface.

81. The apparatus of claim 55, further comprising one or more binary outputs connected to one or more relays to control one or more external loads, and instructions for controlling the one or more binary outputs.

82. The apparatus of claim 81, wherein the external load is an air conditioning unit.

83. An apparatus comprising:
a temperature sensor;
a humidity sensor;
an acoustic sensor;
an airflow sensor;
at least one external sensor interface configured to connect to an external sensor, the external sensor configured to monitor environmental conditions ambient to monitored computer equipment; a web server configured to provide a web page having information derived from at least one of the temperature sensor, the humidity sensor, the acoustic sensor, the air flow sensor, and the external sensor;
and an alarm processing program configured to: determine that an alarm condition has not occurred within a first preset time interval; compare, responsive to determining that the alarm condition has not occurred within the first preset time interval, the sensor signal to a threshold on a second preset time interval; and generate the alarm condition where the sensor signal exceeds the threshold; a simple network management protocol module configured to communicate using a simple network management protocol; at least one network interface responsive to the simple network management protocol module and configured to access a distributed computer network; and an alarm module responsive to at least one of the temperature sensor, the humidity sensor, the acoustic sensor, the air flow sensor, and the external sensor and configured to send an alarm notification via the web server.

84. The apparatus of claim 83, further comprising an interface configured to access an external camera.

85. The apparatus of claim 84, wherein the alarm notification includes an image from the external camera.

86. The apparatus of claim 83, further comprising an email module configured to send email.

* * * * *